United States Patent
Urushihara et al.

(10) Patent No.: US 7,840,974 B2
(45) Date of Patent: Nov. 23, 2010

(54) DISC IDENTIFICATION DEVICE, DISC INSERTION-EJECTION DEVICE, AND DISC DEVICE

(75) Inventors: Kenji Urushihara, Kanagawa (JP); Kazunori Hasegawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 388 days.

(21) Appl. No.: 11/814,142

(22) PCT Filed: Jan. 16, 2006

(86) PCT No.: PCT/JP2006/300442
§ 371 (c)(1), (2), (4) Date: Jul. 17, 2007

(87) PCT Pub. No.: WO2006/075737
PCT Pub. Date: Jul. 20, 2006

(65) Prior Publication Data
US 2009/0055848 A1    Feb. 26, 2009

(30) Foreign Application Priority Data
Jan. 17, 2005   (JP)  .................  P.2005-008971

(51) Int. Cl.
*G11B 17/04* (2006.01)
(52) U.S. Cl. ...................... 720/624; 720/626
(58) Field of Classification Search .............. 720/624, 720/625, 626, 645
See application file for complete search history.

(56) References Cited

U.S. PATENT DOCUMENTS

| | | | |
|---|---|---|---|
| 5,173,893 A | 12/1992 | Morikawa et al. | |
| 5,875,165 A | 2/1999 | Litsche | |
| 7,609,593 B2 * | 10/2009 | Urushihara et al. | 369/30.27 |
| 2005/0088922 A1 * | 4/2005 | Urushihara et al. | 369/30.27 |

FOREIGN PATENT DOCUMENTS

EP    0 780 843 A2    6/1997

(Continued)

OTHER PUBLICATIONS

English-langauge translation of Matsuzaki (JP 2004-086983), published on Mar. 18, 2004.*

(Continued)

*Primary Examiner*—William J Klimowicz
(74) *Attorney, Agent, or Firm*—RatnerPrestia

(57) ABSTRACT

A disc device is for electrically identifying and determining the number of discs inserted into the disc device. Roller members for coming in contact with a disc inserted into the device, transporting the disc, and inserting and ejecting the disc are provided in the vicinity of a disc insertion slot of a cabinet. A lever member for engaging a lever engagement part of a roller member and capable of rotating with a stem member as a supporting point and a push switch for detecting displacement of the lever member are provided. If the disc is inserted into the device, the roller member displaces in the up direction of the disc (A direction in a figure), the lever member displaces in an H direction in the figure, and the displacement of the lever member is detected by the push switch, whereby the thickness of the disc inserted into the device is detected.

12 Claims, 29 Drawing Sheets

| | FOREIGN PATENT DOCUMENTS | | |
|---|---|---|---|
| EP | 1 100 083 A2 | 5/2001 | |
| EP | 06 71 1723 | 5/2010 | |
| JP | 2001-143351 A | 5/2001 | |
| JP | 2001-312850 A | 11/2001 | |
| JP | 2004-86983 A | 3/2004 | |

OTHER PUBLICATIONS

International Search Report for PCT/JP2006/300442, dated Mar. 20, 2006.

* cited by examiner

DISC IDENTIFICATION DEVICE, DISC INSERTION-EJECTION DEVICE, AND DISC DEVICE

This application is a U.S. National Phase Application of PCT International Application PCT/JP2006/300442.

TECHNICAL FIELD

This invention relates to a disc device, a disc identification device for identifying a disc inserted into the disc device, a disc insertion-ejection device for inserting and ejecting a disc, and an electronic apparatus including the disc device.

BACKGROUND ART

A disc device such as a vehicle-installed audio machine including a disc identification device in a related art has a configuration wherein the space between upper and lower fixed disc guide members 30, 31, and 32 and 33 is set to a thickness more than the thickness of one disc and less than that of two discs, thereby preventing two discs from being inserted into the device, as shown in FIGS. 28 and 29.

Patent document 1: JP-A-2001-312850 (FIG. 7, FIG. 9 (b))

DISCLOSURE OF THE INVENTION

Problems to be Solved by the Invention

However, in the disc device in the related art, if two discs are inserted exceeding the proof stress of the upper and lower disc guide members, the upper and lower disc guide members become deformed or are broken and the proof stress for the later insertion of two discs is remarkably degraded and breakage or a flaw may occur on the two inserted discs.

It is therefore an object of the invention to provide a disc device for electrically identifying and determining the number of discs inserted into the disc device and controlling the mechanism of the disc device based on the identification result, so that stable disc insertion and ejection can be realized and damage to the mechanism of the disc device and the disc can be decreased.

Means for Solving the Problems

A disc identification device of the invention is a device for identifying a disc inserted into a disc device and includes a thickness detection member that is movable in a thickness direction of the disc and comes in contact with an upper face or a lower face of the disc, a disc position detection unit that detects a position of the thickness detection member in the thickness direction, and a number-of-discs identification unit that determines whether the number of discs inserted into the disc device is one or plural based on an output of the disc position detection unit.

According to the configuration, the position of the member coming in contact with the disc inserted into the disc device in the disc thickness direction is detected, whereby whether the number of discs inserted into the disc device is one or plural is electrically determined and the mechanism is controlled based on the determination result, so that stable disc thickness detection and disc transportation can be realized without being affected by the characteristics of the light transmittance, light reflectance, etc., of the disc, and damage to the mechanism and the disc can be decreased.

In the disc identification device of the invention, the thickness detection member includes a disc transport roller for pressing and transporting the disc. According to the configuration, stable disc thickness detection can be realized regardless of the magnitude of the light transmittance of the disc inserted into the device, and the number of parts of the disc thickness detection mechanism can be decreased.

The disc identification device of the invention includes a first lever member that increases a displacement of the disc transport roller in the thickness direction and transmits to the disc position detection unit. According to the configuration, the detection sensitivity of the thickness of the disc inserted into the device is improved, whereby the possibility of erroneous detection of the disc thickness can be decreased and stable disc thickness detection can be realized.

In the disc identification device of the invention, the thickness detection member comes in contact with the disc outside in a width direction relative to a disc insertion direction from a disc holding claw of an inserted adapter in which a small-diameter disc is held. According to the configuration, if an 8-cm adapter is inserted into the device, the disc thickness detection unit does not detect the disc holding claw thickness of the 8-cm adapter having a thickness more than the thickness of a usual disc, and stable disc thickness detection can be realized.

In the disc identification device of the invention, the thickness detection member comes in contact with the disc to the depth in the disc insertion direction from a disc transport roller for pressing and transporting the disc. According to the configuration, disc inclination occurring at the disc insertion time into the device can be decreased and stable disc thickness detection can be realized.

In the disc identification device of the invention, the thickness detection member comes in contact with a surface of a side of the disc pressed by the disc transport roller. According to the configuration, stable disc thickness detection of the disc inserted into the device can be realized.

In the disc identification device of the invention, the thickness detection member includes a rotatable roller member in a contact part with the disc. According to the configuration, stable disc thickness detection of the disc inserted into the disc device can be realized, and a flaw of the disc surface that can occur at the disc transporting time can be decreased.

The disc identification device of the invention includes a second lever member that is provided on the front side in the disc insertion direction and moves at a time of coming in contact with the disc. The number-of-discs identification unit determines the number of the inserted discs based on a move timing of the second lever member. According to the configuration, when a plurality of discs are inserted into the disc device, if the disc shift amount is large, whether the number of discs inserted into the disc device is one or plural is determined at an early stage according to the thickness detection of the disc thickness detection unit, so that stable insertion prevention of two discs can be realized. If the shift amount is large and whether the number of discs inserted into the disc device is one or more cannot be determined according to the thickness detection of the disc thickness detection unit although a plurality of discs are inserted into the disc device, whether the number of discs inserted into the disc device is one or more is determined based on the lever operation timing, so that stable insertion prevention of two discs can be realized.

In the disc identification device of the invention, the disc position detection unit includes a switch unit whose state changes in response to the position of the thickness detection member. According to the configuration, the disc position can be easily detected.

A disc insertion-ejection device of the invention is a device for inserting and ejecting the disc based on the identification result of the above-described disc identification device. According to the configuration, stable insertion prevention of two discs can be realized regardless of the types, the characteristics of the light transmittance, light reflectance, etc., and the shift amount of a plurality of discs inserted into the device.

The disc insertion-ejection device of the invention includes a disc transport passage capable of inserting and ejecting a plurality of discs. According to the configuration, if a plurality of discs are forcibly pushed into the disc device, the disc device and the discs are not broken, so that stable disc insertion and ejection can be realized and damage to the mechanism and the discs can be decreased.

A disc device of the invention includes the above-described disc identification device and the above-described disc insertion-ejection device. According to the configuration, stable insertion prevention of two discs can be realized regardless of the types, the characteristics of the light transmittance, light reflectance, etc., and the shift amount of a plurality of discs inserted into the disc device, and if a plurality of discs are forcibly pushed into the disc device, the disc device and the discs are not broken, so that stable disc insertion and ejection can be realized and damage to the mechanism and the discs can be decreased.

An electronic apparatus of the invention includes the above-described disc device. According to the configuration, stable insertion prevention of two discs can be realized regardless of the types, the characteristics of the light transmittance, light reflectance, etc., and the shift amount of a plurality of discs inserted into the device, and if a plurality of discs are forcibly pushed into the disc device, the disc device and the discs are not broken, so that stable disc insertion and ejection can be realized and damage to the mechanism and the discs can be decreased.

Advantages of the Invention

According to the invention, the number of discs inserted into the disc device is electrically identified and determined and the mechanism of the disc device is controlled based on the identification result, so that stable disc insertion and ejection can be realized and damage to the mechanism of the disc device and the disc can be decreased.

DESCRIPTION OF REFERENCE NUMERALS

Figure 1:
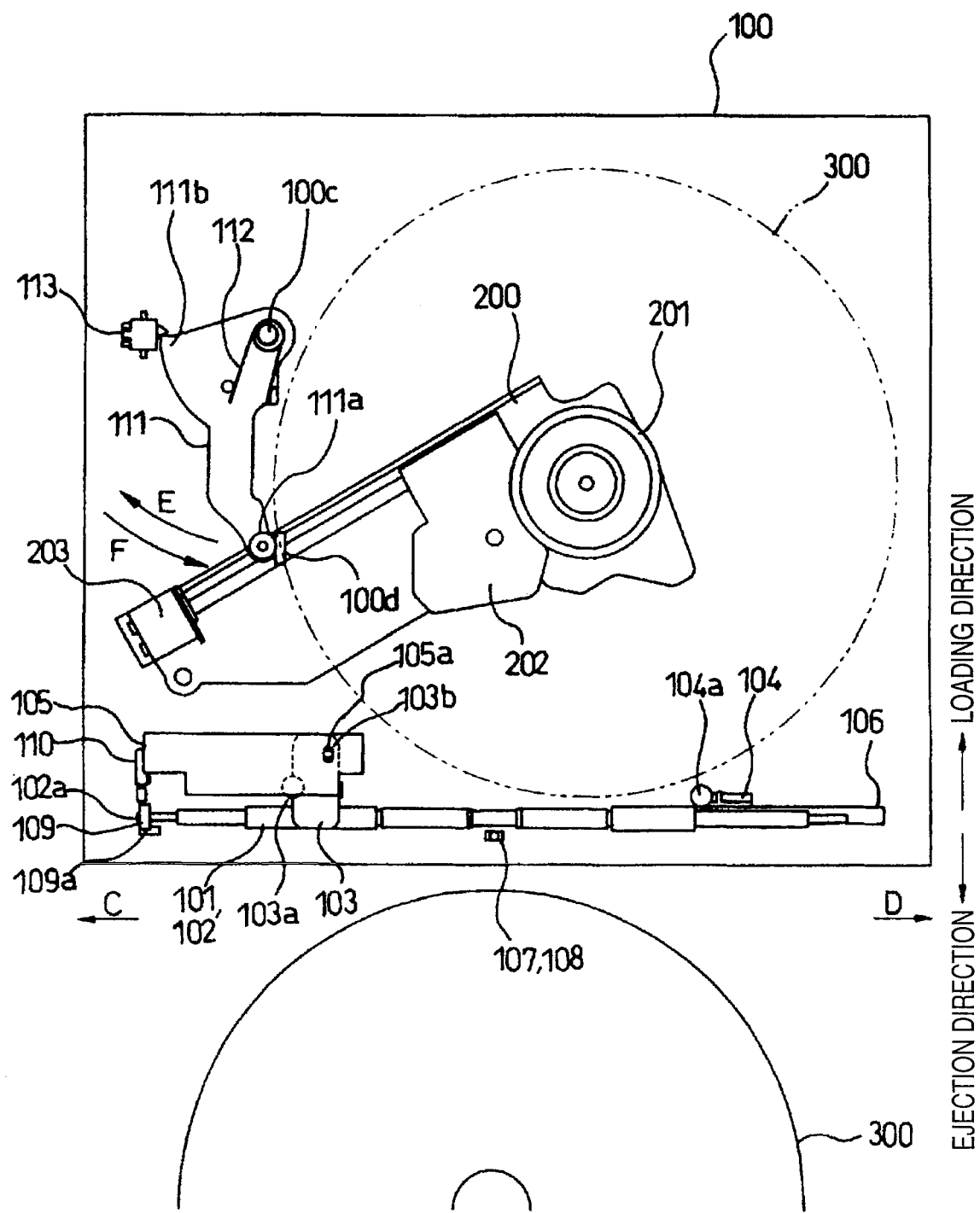
FIG. 1 is a top view of the disc device main part of a first embodiment of the invention.

100 Cabinet
100a Disc insertion slot
100b Stopper section
100c Stem member
100d Stopper section
101 Roller member
102 Roller member
102a Lever engagement part
103 Lever member
103a Stem member
103b Groove
104 Lever member
104a Stem member
104b Groove
105 Position sensor
105a Stem member
106 Position sensor
106a Stem member
107 Light emission element
108 Light reception element
109 Lever member
109a Stem member
109b Groove
109c Switch contact part
109d Stopper contact part
110 Push switch
111 Lever member
111a Roller member
111b Switch contact part
112 Elastic member
113 Push switch
200 Disc record and playback section
201 Spindle motor
202 Optical pickup
203 Traverse motor
300 Disc
301 8-cm adapter
301a 8-cm disc holding claw
302 8-cm disc

BEST MODE FOR CARRYING OUT THE INVENTION

Disc devices of embodiments of the invention will be discussed with the accompanying drawings.

First Embodiment

Figure 2:
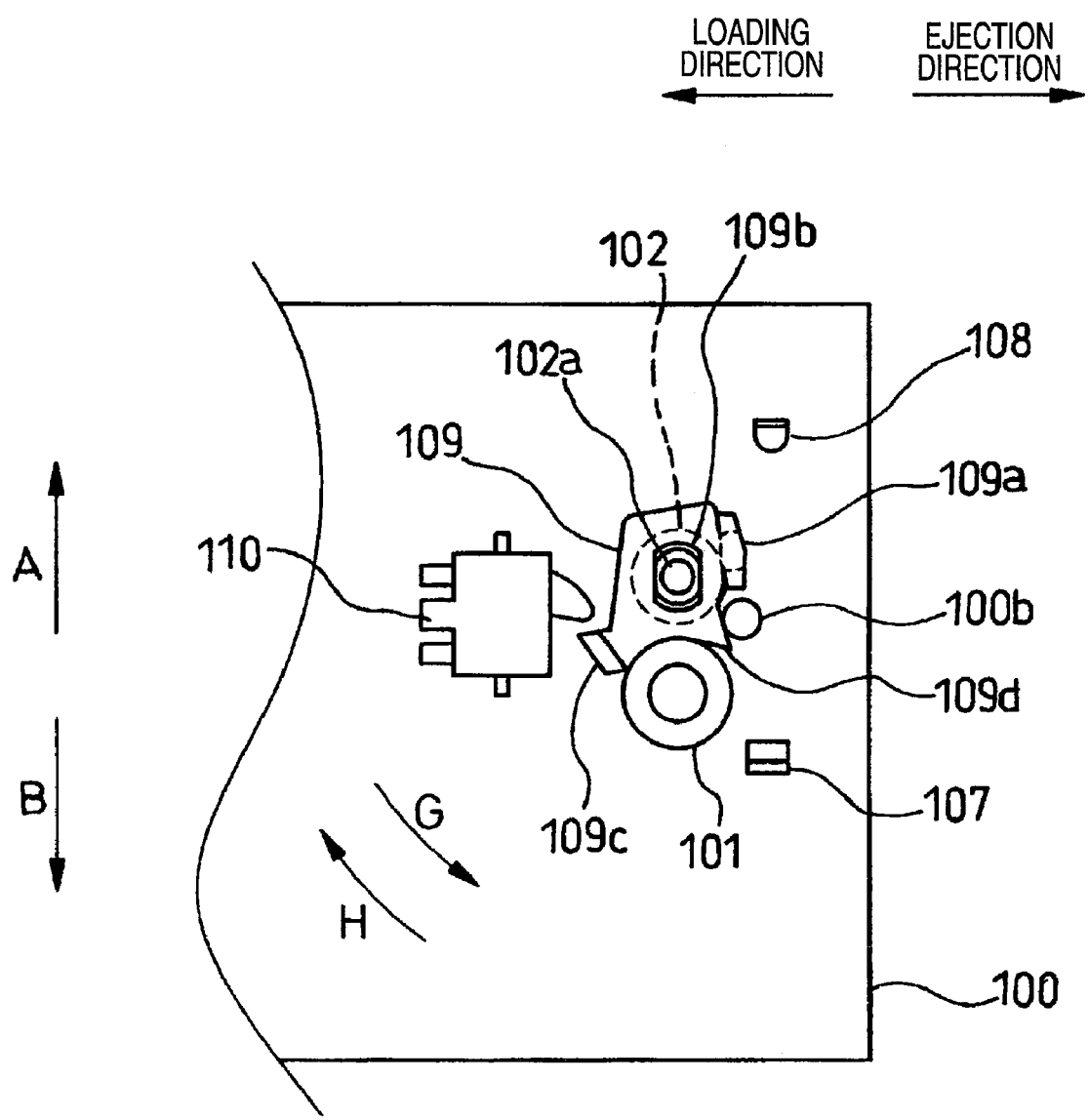
FIG. 2 is a side view of the disc device main part of the first embodiment of the invention.
Figure 3:
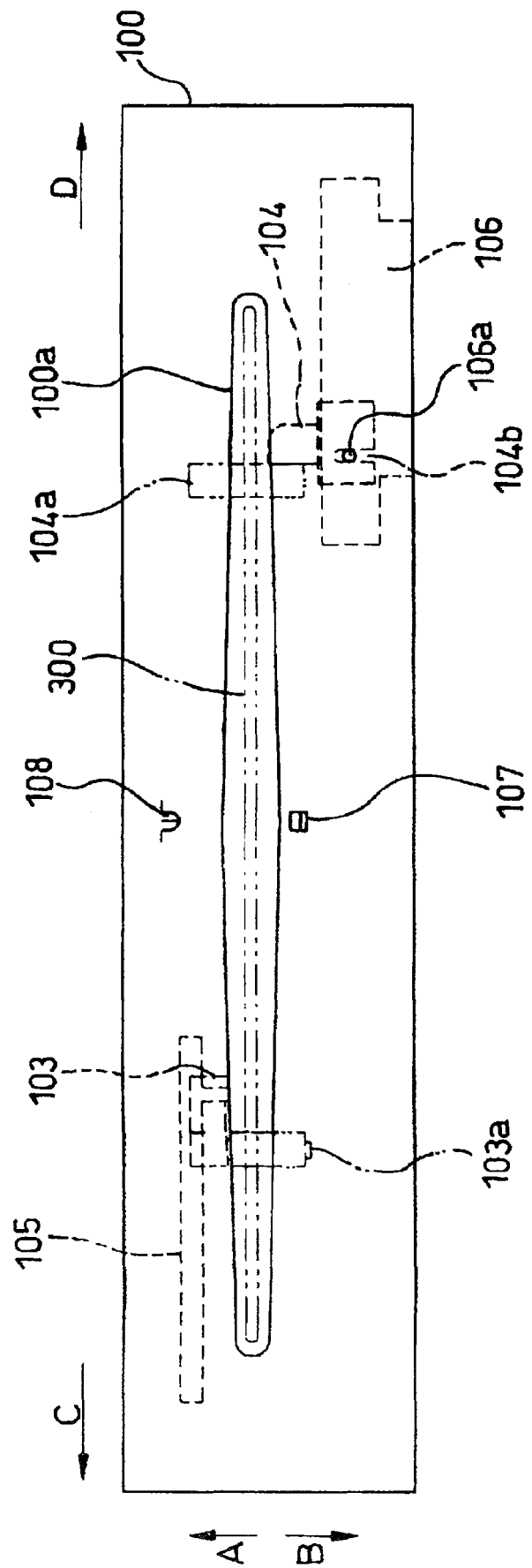
FIG. 3 is a front view of the disc device main part of the first embodiment of the invention.

FIGS. 1, 2, and 3 show a disc device of a first embodiment of the invention. FIG. 1 is a top view of the disc device main part of the first embodiment of the invention, FIG. 2 is a side view of the disc device main part of the first embodiment of the invention, and FIG. 3 is a front view of the disc device main part of the first embodiment of the invention. In FIGS. 1, 2, and 3, a disc insertion slot 100a is placed on the front of a cabinet 100.

Provided in the vicinity of the disc insertion slot 100a of the cabinet 100 are roller members 101 and 102 for implementing transport means for coming in contact with an inserted disc and transmitting power, thereby transporting disc 300 and inserting (loading) and ejecting the disc 300 and a power source (not shown) for rotating the roller member 101. The roller member 102 rotates in conjunction with the roller member 101 when the disc 300 is inserted (loaded) and is ejected.

A move of the roller member 101 is restricted in an up and down direction (A direction or B direction in the figure) relative to the cabinet 100. The roller member 102 can move in the up and down direction (A direction or B direction in the figure) relative to the cabinet 100 and is urged in the down direction (B direction in the figure) relative to the cabinet 100 by the action of an elastic member (not shown) for urging the roller member 102.

Therefore, when the disc 300 is inserted into the disc, the roller member 102 moves in the up direction (A direction in the figure) relative to the cabinet 100 and the disc 300 is pressed between the roller member 101 and the roller member 102. The movable amount of the roller member 102 in the up direction (A direction in the figure) is secured more than the move amount when a plurality of discs (for example, two discs) are inserted and if a plurality of discs are inserted into the disc, the roller member 101 and the roller member 102 press the disc for rotation and the disc can be loaded and ejected. Thus, the roller member 102 functions as a thickness detection member for coming in contact with the top face of the disc 300 and moving in the up and down direction (A direction or B direction in the figure) relative to the cabinet 100, namely, in the thickness direction of the disc 300.

A lever member 103 having a stem part 103a for coming in contact with the outer periphery of the disc 300 when the disc 300 is inserted into the disc device and a lever member 104 having a stem part 104a for coming in contact with the outer periphery of the disc 300 when the disc 300 is inserted into the disc device are provided in the vicinity of the disc insertion slot 100a of the cabinet 100 and to the depth in the loading direction from the roller members 101 and 102.

The lever member 103 and the lever member 104 are provided slidably in a side-to-side direction (C direction, D direction in the figure) relative to the cabinet 100, and an elastic member (not shown) for urging the lever member 103 and the lever member 104 to the center side of the disc insertion slot is provided between the lever member 103 and the lever member 104. Therefore, the lever member 103 and the lever member 104 come in contact with a stopper part (not shown) provided in the cabinet 100 and are held at the initial position in a state in which no disc is inserted into the device.

A position sensor 105 having a projection 105a and a position sensor 106 having a projection 106a are provided in the vicinity of the disc insertion slot 100a of the cabinet 100. The projection 105a of the position sensor 105 engages a groove 103b of the lever member 103 so that the position sensor 105 can detect displacement of the lever member 103 in the side-to-side direction (C direction, D direction in the figure). Likewise, the projection 106a of the position sensor 106 engages a groove 104b of the lever member 104 so that the position sensor 106 can detect displacement of the lever member 104 in the side-to-side direction (C direction, D direction in the figure).

A light emission element 107 and a light reception element 108 paired with the light emission element 107 are provided in the vicinity of the disc insertion slot 100a of the cabinet 100 and when a disc is inserted into the device, light emitted from the light emission element 107 is shielded by the disc and output of the light reception element 108 changes to a High state, thereby making it possible to detect disc insertion into the device. When light is shielded, the light reception element 108 outputs a High signal; when light is received, the light reception element 108 outputs a Low signal.

A lever member 109 and a push switch 110 whose state changes in response to the position of the lever member 109 are provided in the vicinity of the disc insertion slot 100a of the cabinet 100. The lever member 109 is provided with a stem member 109a, a groove 109b, a switch contact part 109c, and a stopper contact part 109d. The lever member 109 is placed rotatably on the stem member 109a with respect to the cabinet 100. A lever engagement part 102a provided on the roller member 102 engages the groove 109b of the lever member 109 and when the roller member 102 moves in the up direction (A direction in the figure), the lever member 109 rotates in an H direction in the figure. The cabinet 100 is provided with an elastic member (not shown) for urging the lever member 109 in a G direction in the figure and the stopper contact part 109d provided on the lever member 109 comes in contact with a stopper part 100b provided in the cabinet 100 and the lever member 109 is held at the initial position in a state in which no disc 300 is inserted into the device.

Therefore, when the disc 300 is inserted, the roller 102 comes in contact with the disc 300 and moves and the lever member 109 rotates in response to the move of the roller 102. Since the state of the push switch 110 changes in response to the rotation amount of the lever member 109, an electric signal responsive to the position of the inserted disc can be obtained. In the lever member 109, the distance from the stem member 109a as a rotation supporting point to the switch contact part 109c is made larger than the distance from the stem member 109a to the groove 109b, whereby displacement of the roller 102 in the up direction (A direction in the figure) is increased and is transmitted to the push switch 110 for improving the detection accuracy as to whether one disc is inserted or a plurality of discs (for example, two discs) are inserted depending on variations in the thickness of the disc inserted into the device.

If no disc 300 is inserted into the device or if one disc 300 is pressed between the roller member 101 and the roller member 102, the switch contact part 109c provided on the lever member 109 does not come in contact with the push switch 110 and thus output of the push switch 110 remains High and if a plurality of discs (for example, two discs) are pressed between the roller member 101 and the roller member 102, the switch contact part 109c provided on the lever member 109 comes in contact with the push switch 110 and thus output of the push switch 110 goes Low. Thus, the thickness of the disc inserted into the device can be detected according to the output of the push switch 110.

The disc device is provided with a lever member 111 having a roller member 111a for coming in contact with the disc 300 and provided rotatably with a stem member 100c provided in the cabinet 100 as the supporting point, a push switch 110 for coming in contact with a switch contact part 111b provided on the lever member 111 to detect displacement of the lever member 111, and an elastic member 112 for urging the lever member 111 in an F direction in the figure. In more detail, in a state in which no disc 300 is inserted into the device, the lever member 111 is urged by the elastic member 112 in the F direction in the figure and the roller member 111a of the lever member 111 comes in contact with a stopper 100d provided in the cabinet 100 and the lever member 111 is held at the initial position. At this time, the switch contact part 111b of the lever member 111 does not come in contact with push switch 113. the roller member 111a of the lever member 111 If a disc is inserted into the device, the roller member 111a provided on the lever member 111 comes in contact with the disc, whereby the lever member 111 rotates in the F direction in the figure and the switch contact part 111b of the lever member 111 comes in contact with the push switch 113.

When a disc is detected, the push switch 113 outputs a High signal; when no disc is detected, the push switch 113 outputs a Low signal.

A disc record and playback section 200 includes a spindle motor 201 for rotating a disc, an optical pickup 202 for recording and playing back disc information, and a traverse motor 203 for driving the optical pickup 202 in the inner and outer peripheral directions of the disc.

(1) Loading Operation of Disc 300

To begin with, the loading operation of the disc 300 into the disc device will be discussed with FIGS. 4, 5, 6, 7, 8, 9, 10, and 11. In the disc device of the embodiment, a 12-cm disc is inserted and ejected and is played back or recorded, but an 8-cm disc can also be handled. To play back or record an 8-cm disc, an adapter for holding the 8-cm disc in the center is used. The adapter holding the 8-cm disc is handled in a similar manner to a 12-cm disc 300 and therefore will not be discussed.

Figure 4:
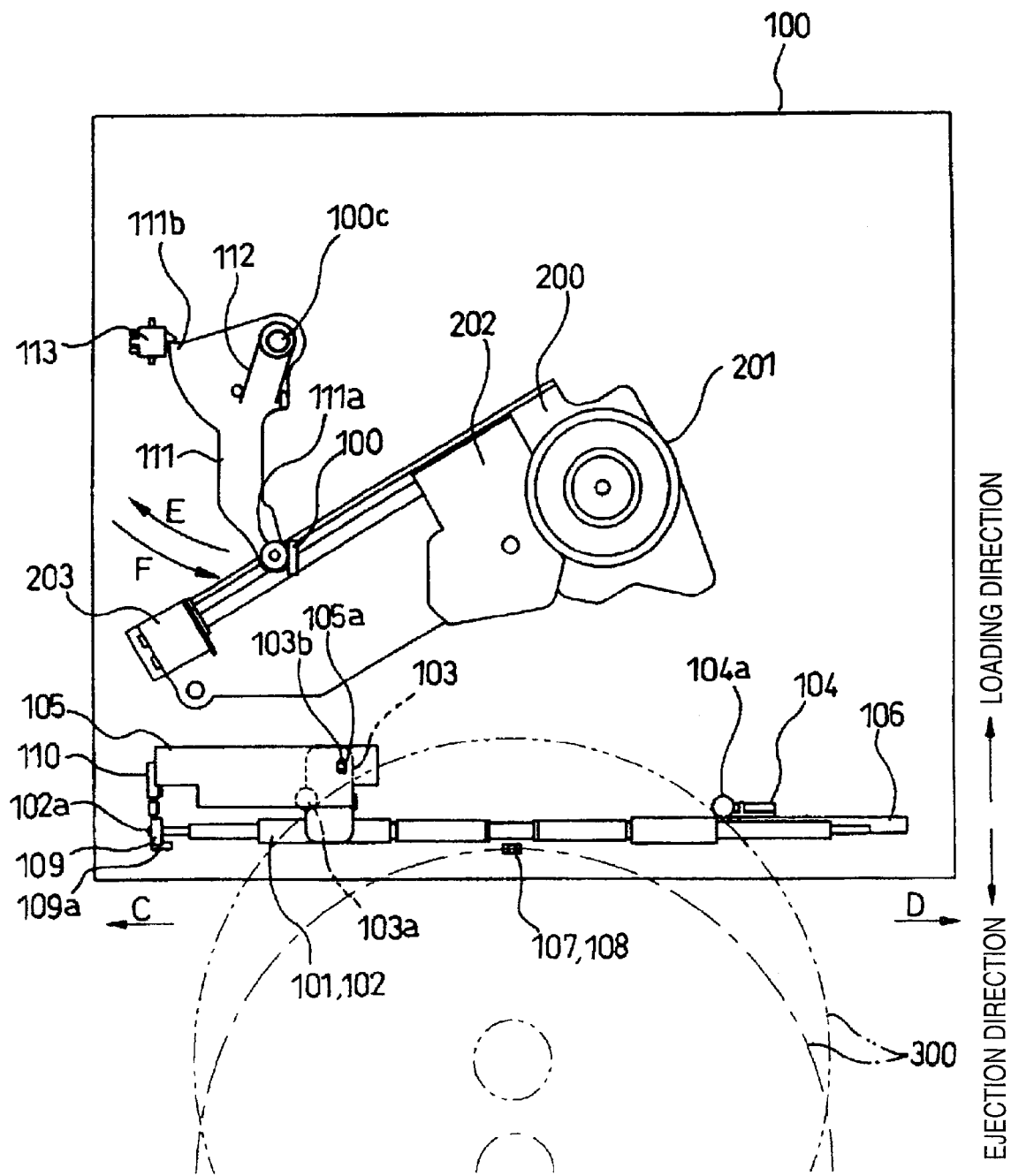
FIG. 4 is a top view of the disc device main part when a disc passes through a disc insertion-ejection section in the disc device of the first embodiment of the invention.
Figure 5:
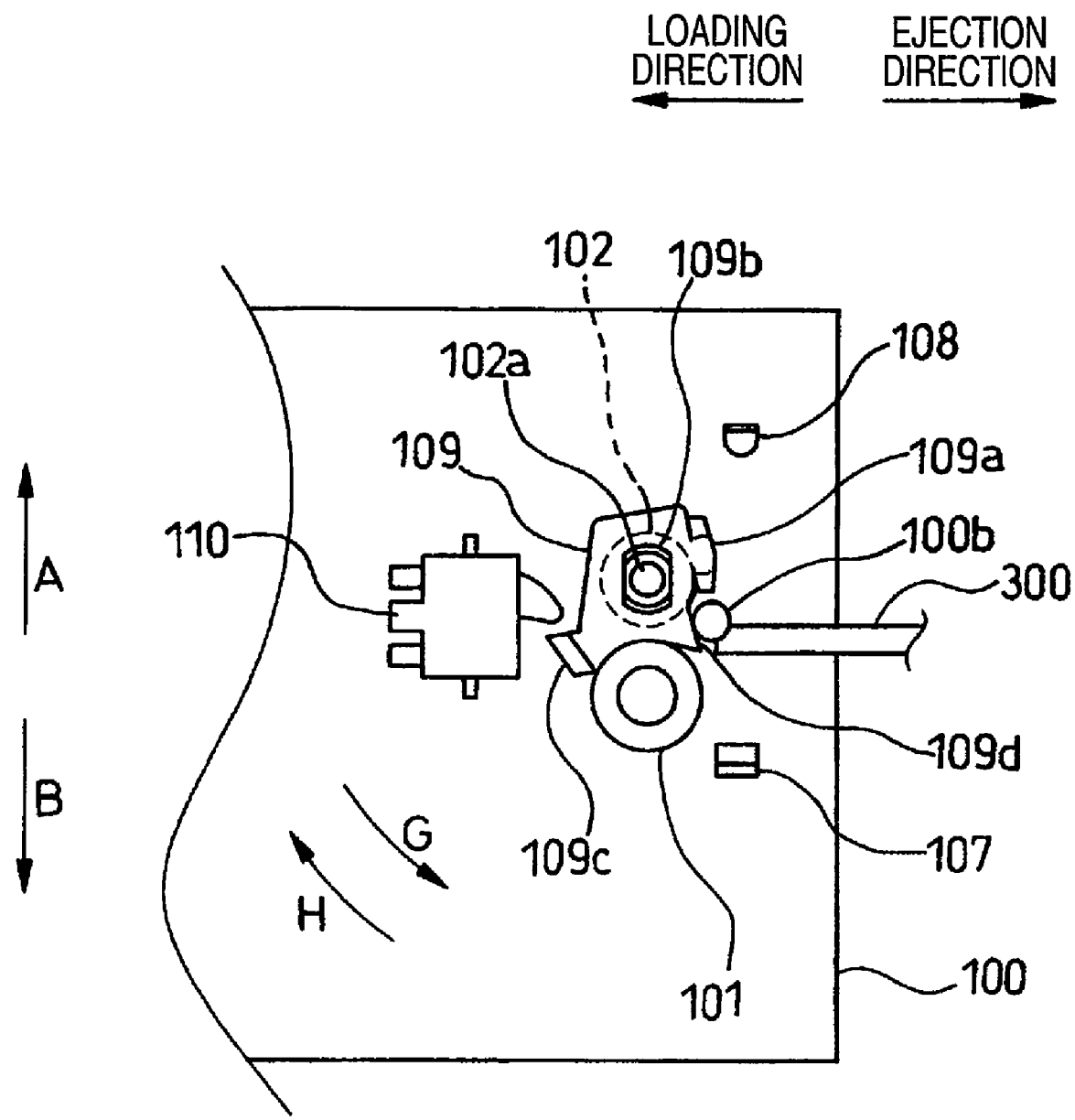
FIG. 5 is a side view of the disc device main part when a disc passes through the disc insertion-ejection section in the disc device of the first embodiment of the invention.
Figure 6:
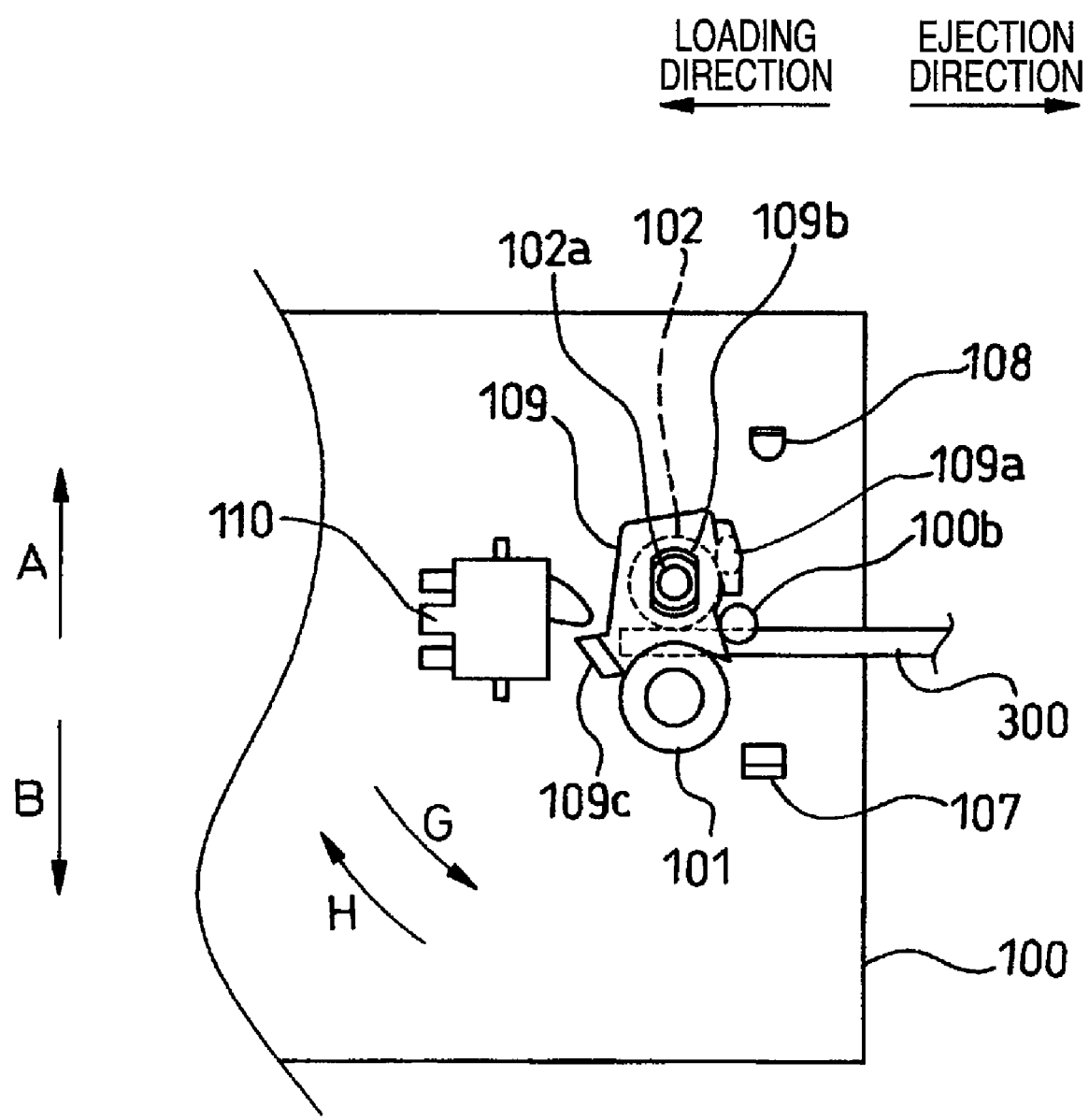
FIG. 6 is a side view of the disc device main part when a disc passes through the disc insertion-ejection section in the disc device of the first embodiment of the invention.
Figure 7:
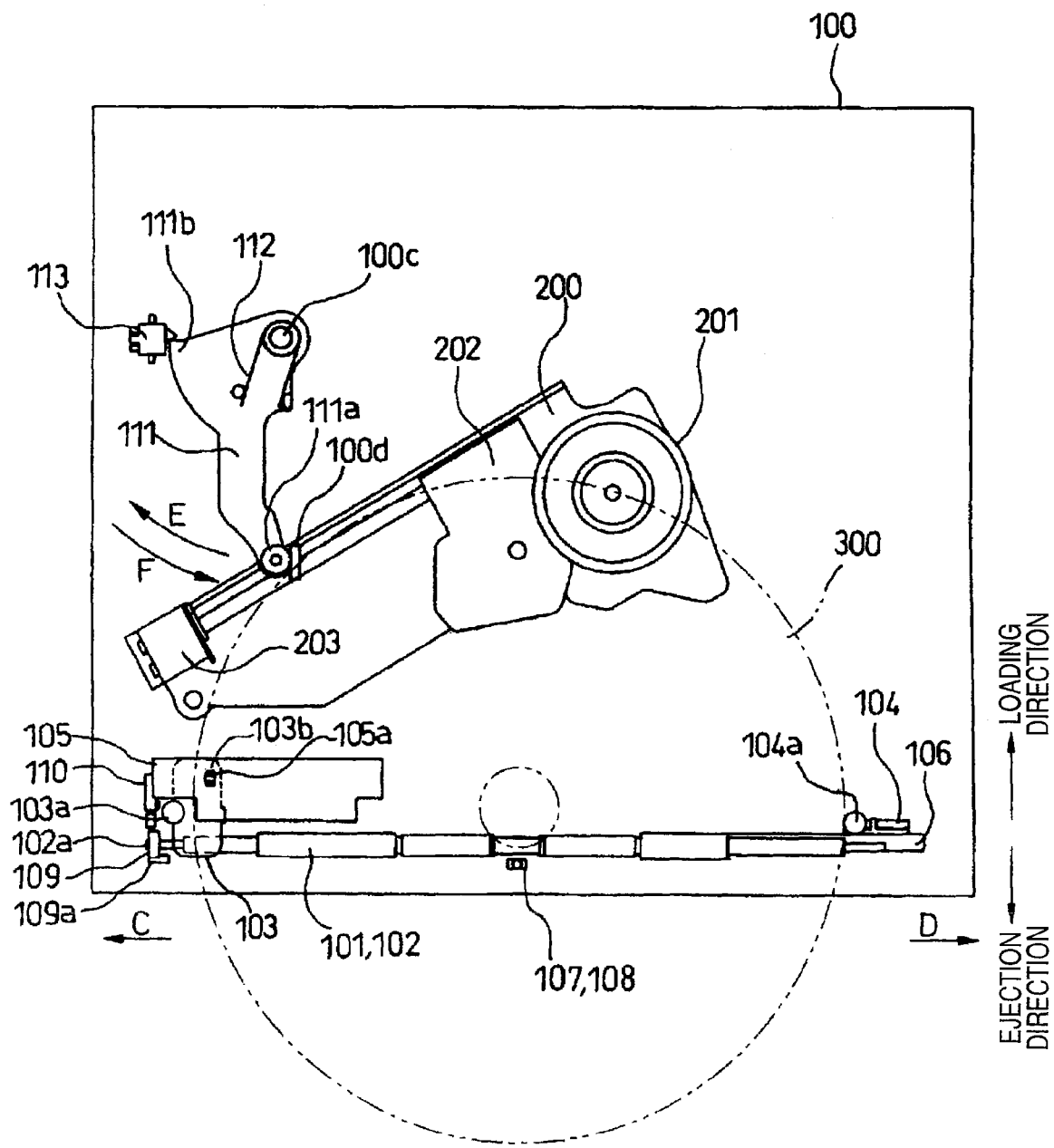
FIG. 7 is a top view of the disc device main part when a disc passes through the disc insertion-ejection section in the disc device of the first embodiment of the invention.
Figure 8:
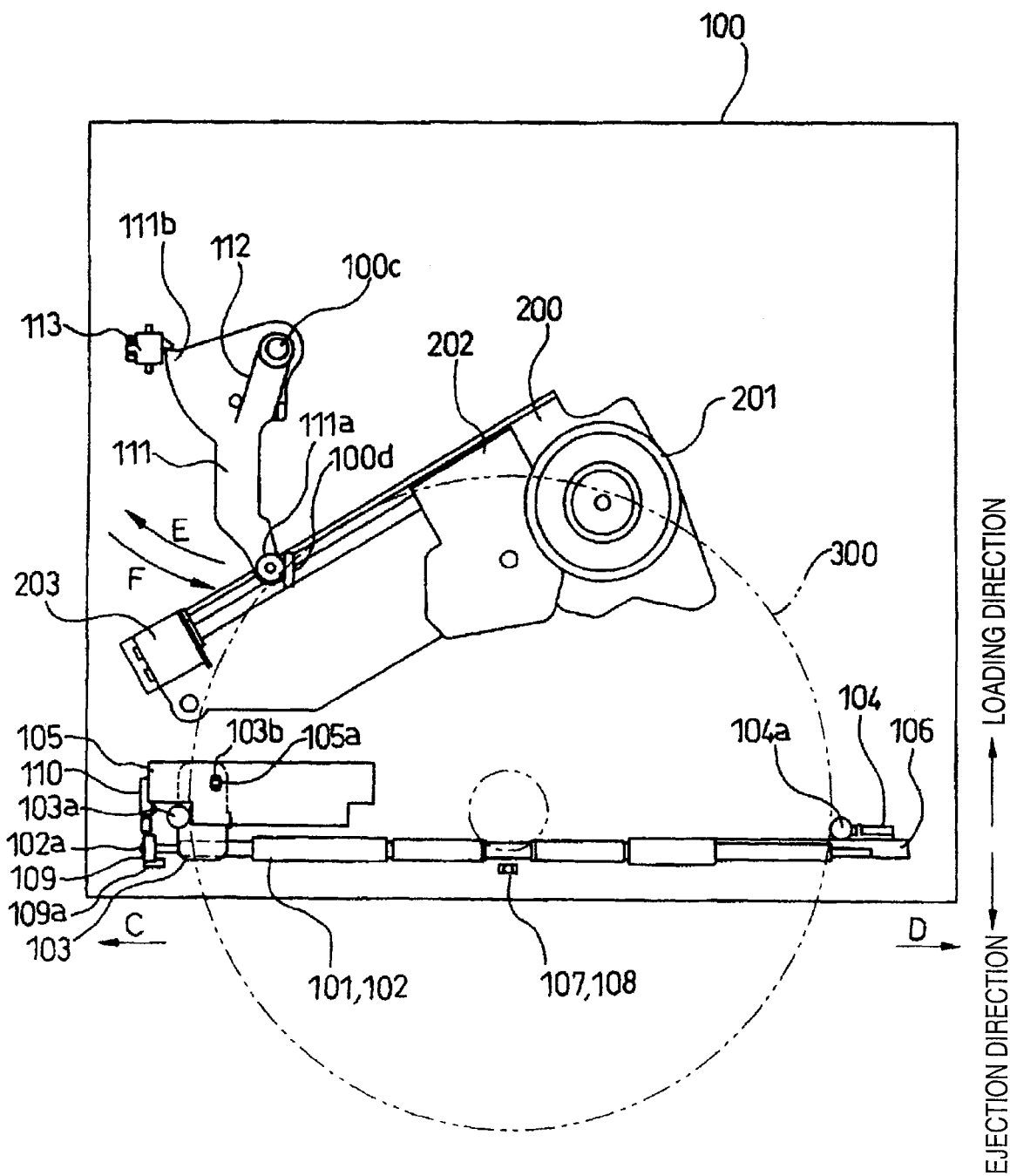
FIG. 8 is a top view of the disc device main part when a disc passes through the disc insertion-ejection section in the disc device of the first embodiment of the invention.
Figure 9:
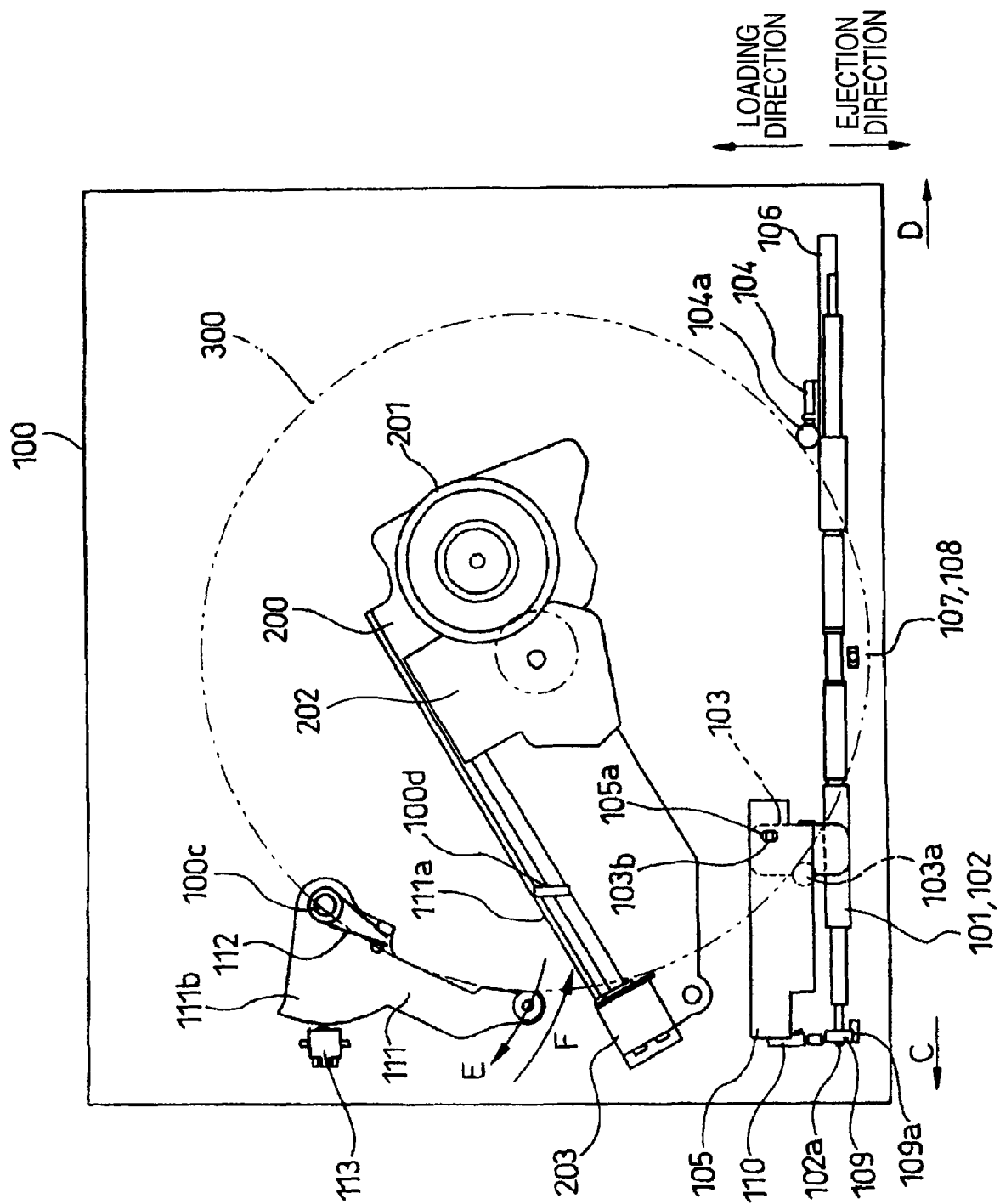
FIG. 9 is a top view of the disc device main part when a disc passes through the disc insertion-ejection section in the disc device of the first embodiment of the invention.
Figure 10:
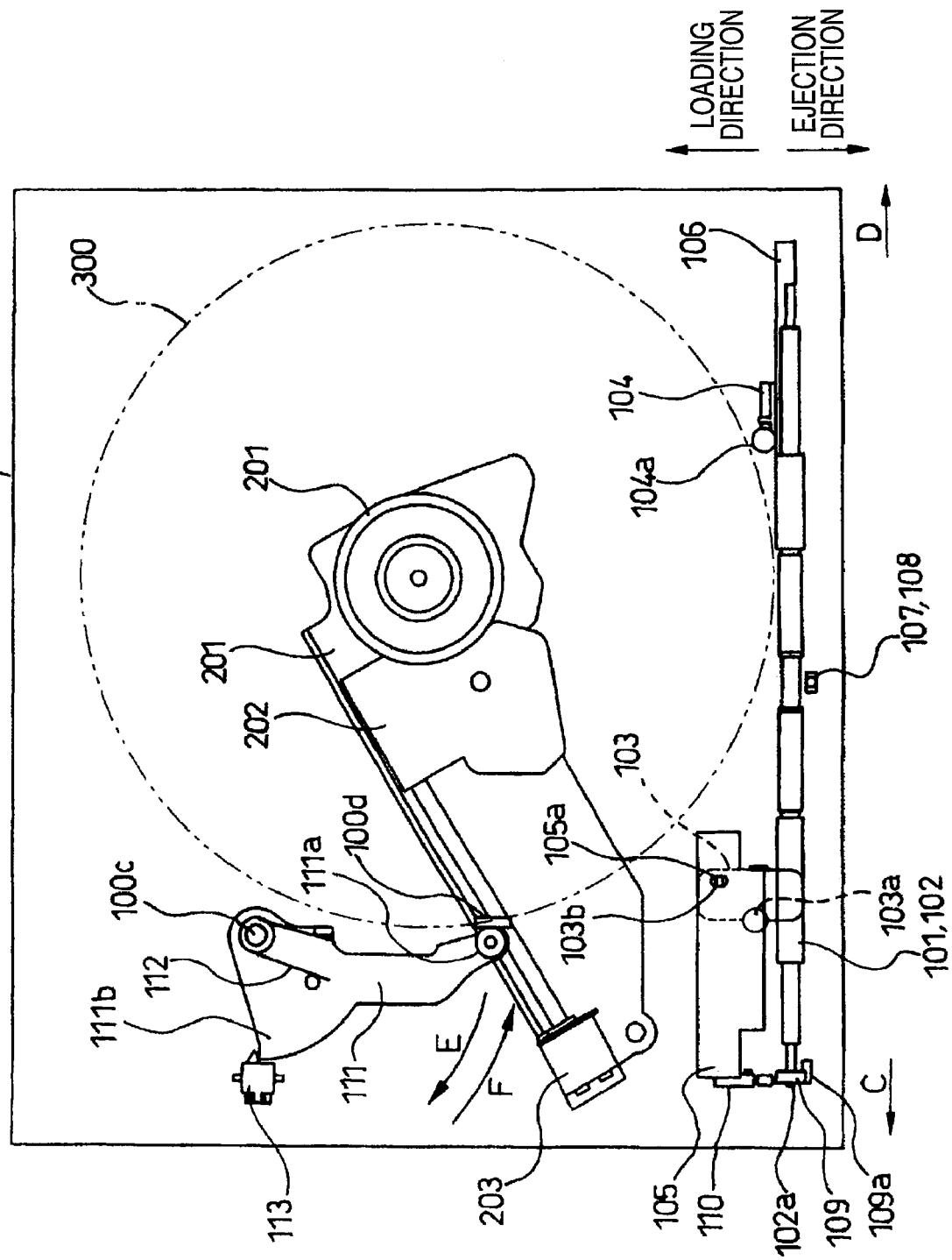
FIG. 10 is a top view of the disc device main part when a disc passes through the disc insertion-ejection section in the disc device of the first embodiment of the invention.

When the user inserts the disc 300 into the disc insertion slot 100a of the cabinet 100 of the disc device, light emitted from the light emission element 107 is shielded by the disc 300 and output of the light reception element 108 changes to a High state, thereby detecting insertion of the disc 300 into the disc device, and the disc device starts the operation of the power source to start rotation of the roller member 101 (see FIGS. 4 and 5).

If the user further inserts the disc 300, the disc 300 is pressed between the roller members 101 and 102 and auto loading of the disc 300 is started. The roller member 102 displaces in the up direction (A direction in the figure), whereby the lever member 109 rotates in the H direction in the figure with the stem member 109a as the supporting point because of the relationship between the lever engagement part 102a of the roller member 102 and the groove 109b of the lever member 109. However, if one disc is inserted into the device, the switch contact part 109c of the lever member 109 and the push switch 110 do not come in contact with each other and output of the push switch 110 remains High (see FIG. 6).

If the auto loading of the disc 300 is continued, the disc 300 comes in contact with the stem members 103a and 104a of the lever members 103 and 104 and the lever member 103 starts to slide in the C direction in the figure and the lever member 104 starts to slide in the D direction in the figure. Accordingly, the output levels of the position sensors 105 and 106 increase and reach the maximum in a state in which the portion of the largest diameter of the disc 300 comes in contact with the stem members 103a and 104a (see FIG. 7).

When the disc 300 further proceeds, the disc 300 comes in contact with the roller member 111a of the lever member 111 and the lever member 111 starts to rotate in an E direction in the figure against the urging force of the elastic member 112. The lever member 111 rotates and the switch contact part 111b of the lever member 111 comes in contact with the push switch 113, whereby the output of the push switch 113 makes a High to Low transition (see FIG. 8).

When the disc 300 further proceeds, the disc 300 is brought out of contact with the stem member 103a of the lever member 103 and the stem member 104a of the lever member 104 and the lever members 103 and 104 are held at the initial position. The output levels of the position sensors 105 and 106 are also restored to the initial position (see FIG. 9).

When the disc 300 further proceeds, pressing the disc 300 between the roller members 101 and 102 is released and the disc 300 is moved in the record and playback position direction by the action of the lever member 111 and the elastic member 112. The engagement of the lever member 111 and the push switch 113 is released and the output of the push switch 113 makes a Low to High transition. The operation of the drive source not shown is stopped at the timing at which the output of the push switch 113 makes the Low to High transition, whereby rotation of the roller member 101 stops.

Next, the disc 300 is transported to the record and playback position of the disc record and playback section 200 by a mechanism not shown, and is held on the spindle motor 201. As the operation is performed, the loading operation of the disc 300 is completed and the disc device enters a state in which it can record and play back the disc 300 (see FIG. 10).

Figure 11:
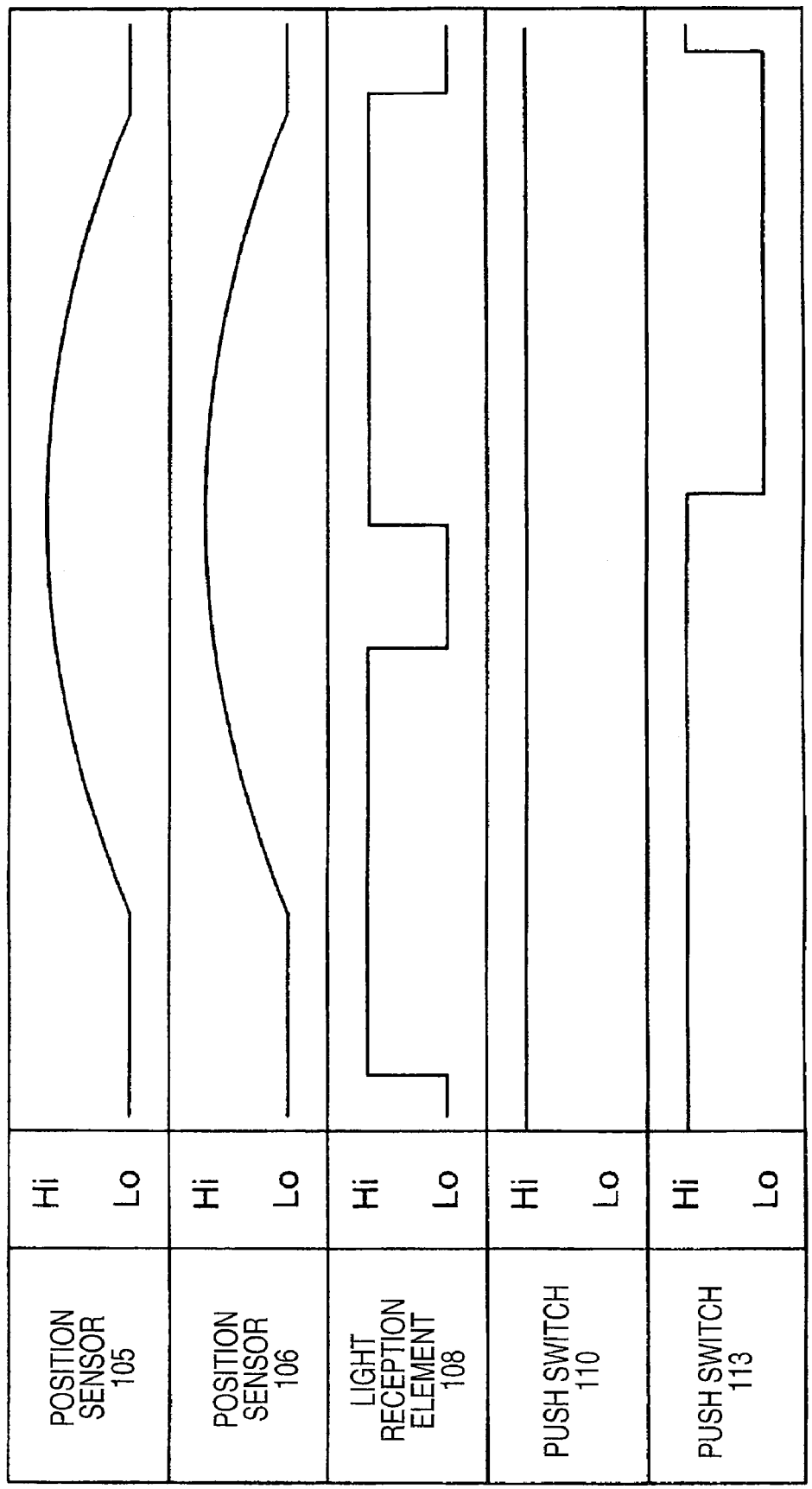
FIG. 11 is a timing chart of outputs of sensors of the disc device when a disc passes through the disc insertion-ejection section in the disc device of the first embodiment of the invention.

FIG. 11 shows the states of the position sensors 105 and 106, the light reception element 108, and the push switches 110 and 113 during the operation described above.

(2) Ejection Operation of Disc 300

Figure 12:
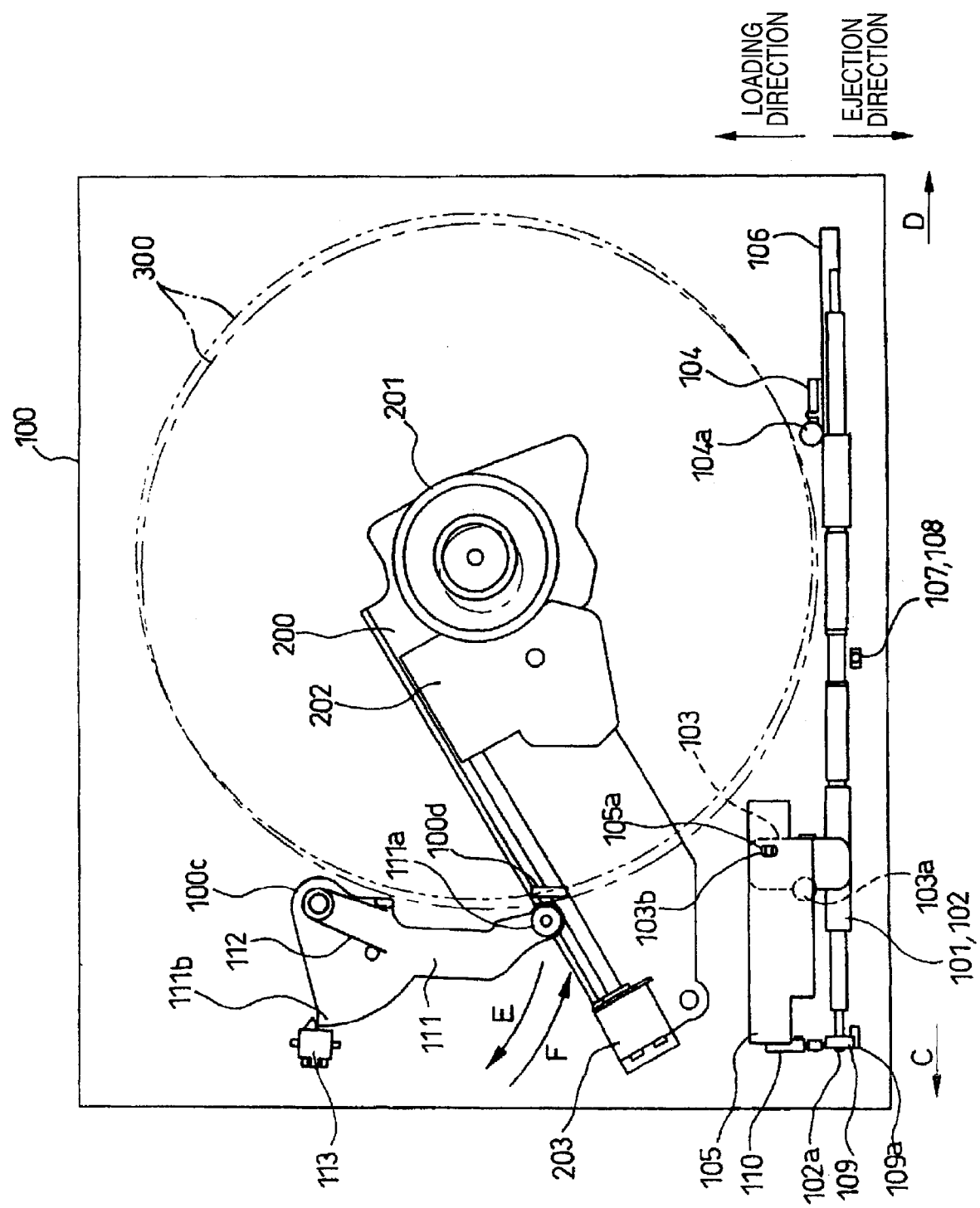
FIG. 12 is a top view of the disc device main part when a disc passes through the disc insertion-ejection section in the disc device of the first embodiment of the invention.
Figure 13:
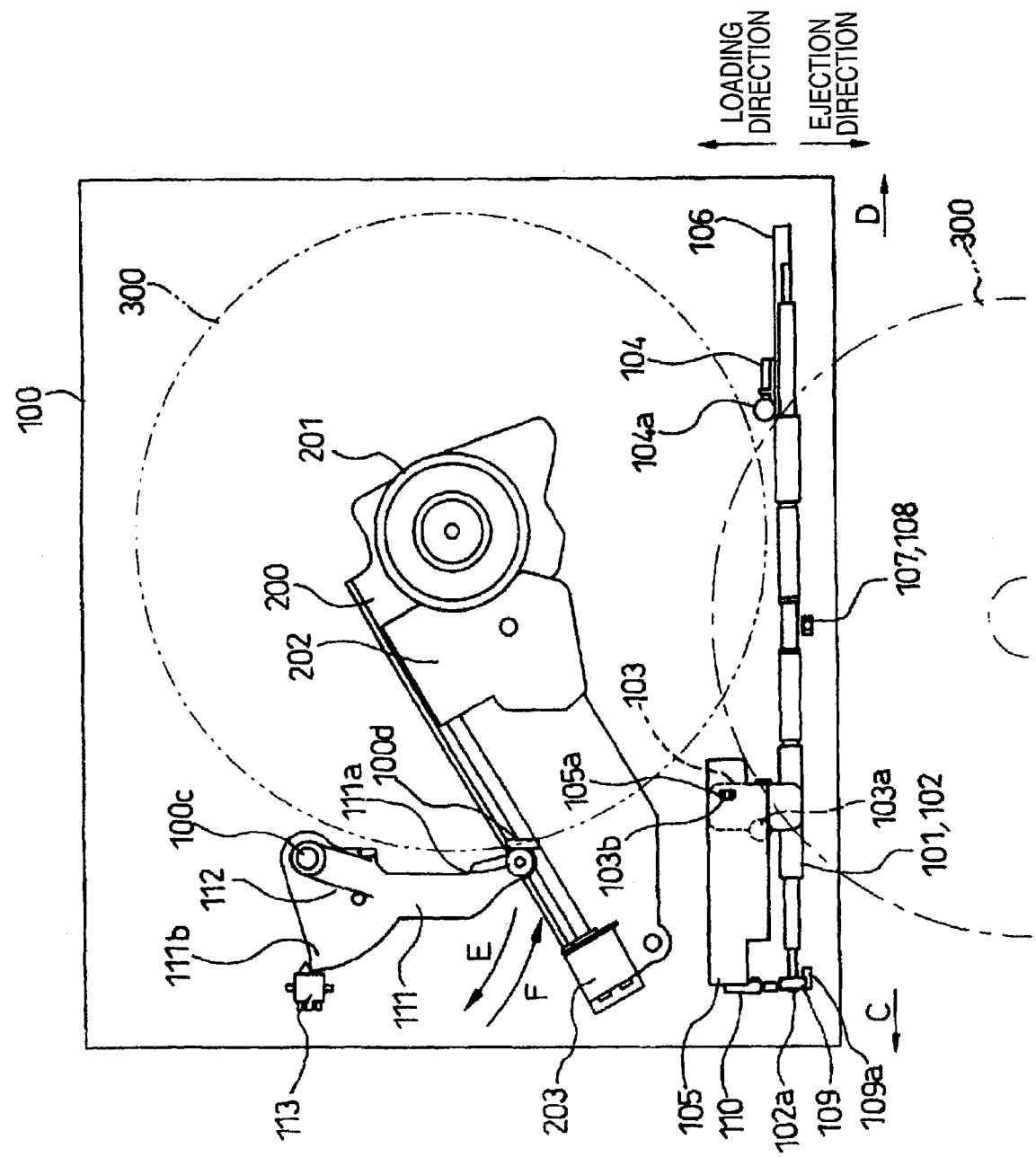
FIG. 13 is a top view of the disc device main part when a disc passes through the disc insertion-ejection section in the disc device of the first embodiment of the invention.

Next, the ejection operation of the disc 300 from the disc device will be discussed with FIGS. 12 and 13.

First, holding the disc 300 on the spindle motor 201 is released by a mechanism not shown and the ejection operation of the disc 300 is started.

Next, the disc 300 is transported in the ejection direction by the mechanism not shown and comes in contact with the roller member 111a of the lever member 111 and the lever member 111 starts to rotate in the E direction in the figure against the urging force of the elastic member 112. The lever member 111 rotates and the switch contact part 111b of the lever member 111 comes in contact with the push switch 113, whereby the output of the push switch 113 makes a High to Low transition. The operation of the drive source not shown is started at the timing at which the output of the push switch 113 makes the Low to High transition, whereby rotation of the roller member 101 is started (see FIG. 12).

When the disc 300 is further transported by the mechanism not shown, the disc 300 and the roller member 101 come in contact with each other and the disc 300 is pressed between the roller members 101 and 102, whereby transporting of the disc 300 by the roller member 101 is started.

The disc 300 proceeds in the ejection direction at the opposite timing to the loading time and is transported to an ejection completion position. The ejection completion of the disc 300 is detected by the light reception element 108, the position sensors 105 and 106, or detection means not shown (see FIG. 13).

As the operation is performed, the ejection operation of the disc 300 is completed.

Operation for a Plurality of Discs 300

Next, the operation of the disc device for a plurality of discs 300 will be discussed with FIGS. 14, 15, 16, 17, and 18. It is assumed that two discs overlap in a slight shift state and are inserted into the disc insertion slot 100a.

If the user inserts a plurality of discs 300 into the disc insertion slot 100a of the cabinet 100 of the disc device, light emitted from the light emission element 107 is shielded by the disc 300 going ahead and output of the light reception element 108 changes to a High state, thereby detecting insertion of the disc 300 into the disc device, and the disc device starts the operation of the power source to start rotation of the roller member 101.

Figure 14:
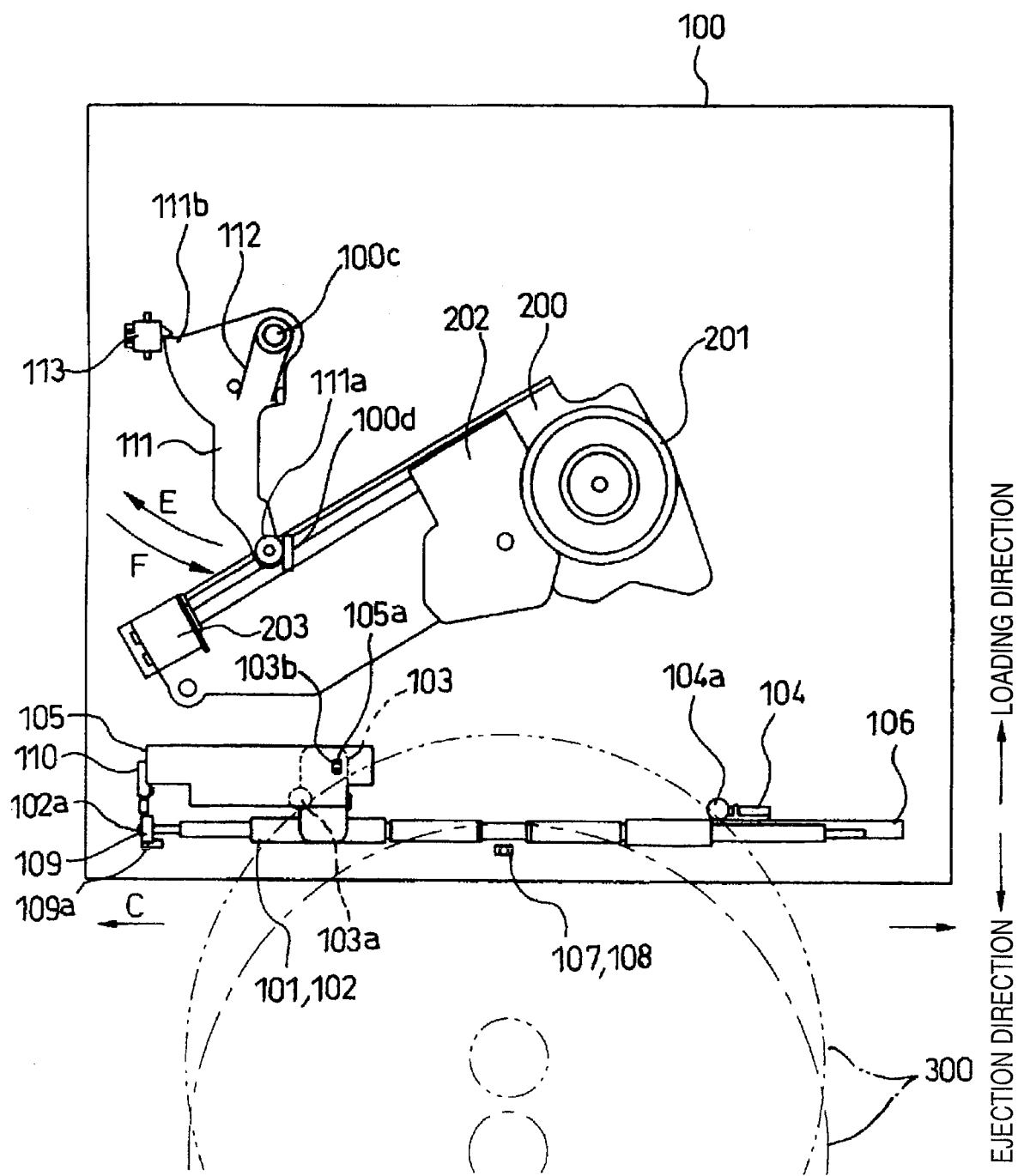
FIG. 14 is a top view of the disc device main part when two discs pass through the disc insertion-ejection section in the disc device of the first embodiment of the invention.
Figure 15:
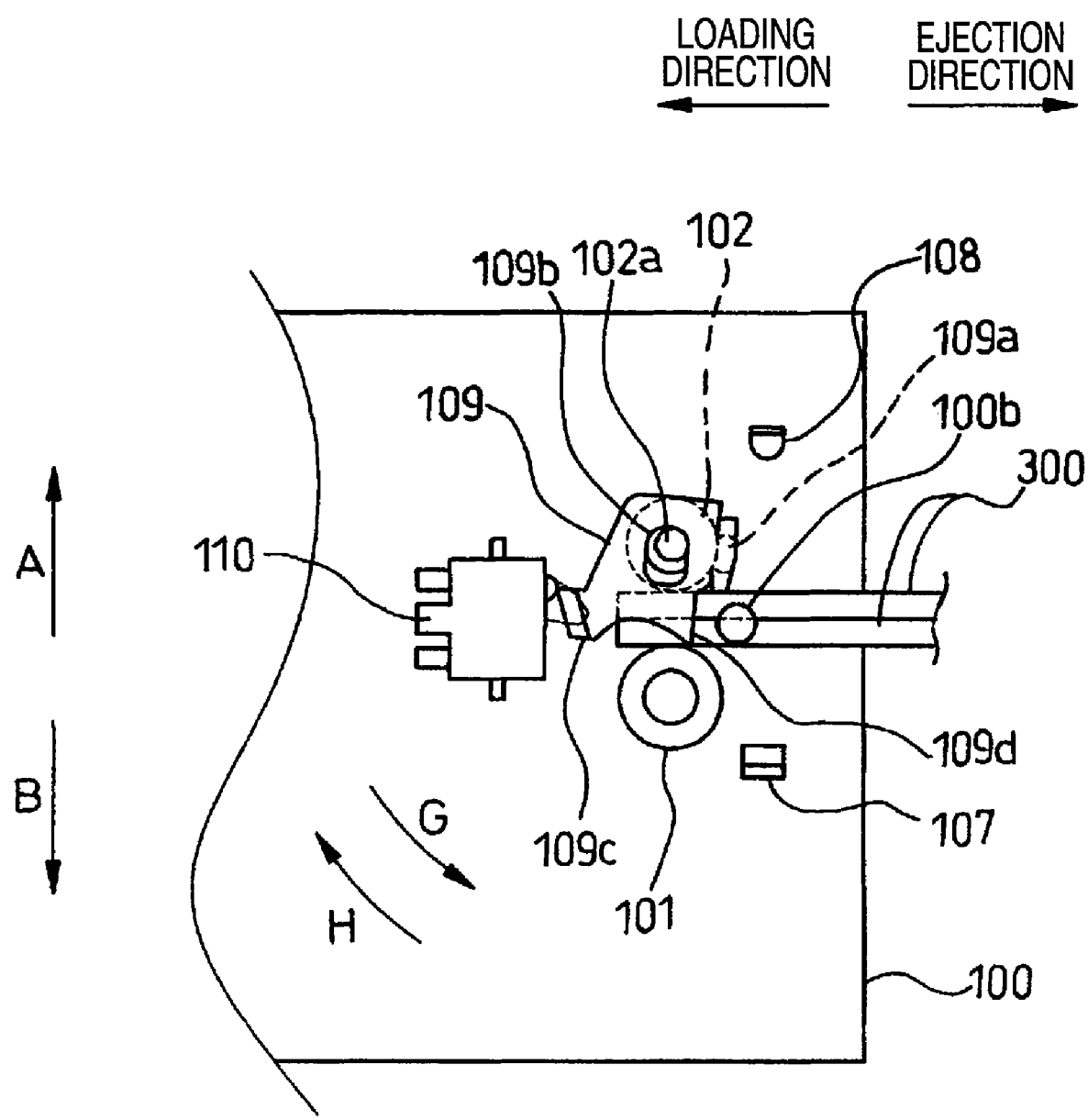
FIG. 15 is a side view of the disc device main part when two discs pass through the disc insertion-ejection section in the disc device of the first embodiment of the invention.

If the user further inserts the plurality of discs 300, the disc 300 going ahead is pressed between the roller members 101 and 102, whereby auto loading of the disc 300 is started (see FIG. 14).

The roller member 102 displaces in the up direction (A direction in the figure), whereby the lever member 109 rotates in the H direction in the figure with the stem member 109a as the supporting point because of the relationship between the lever engagement part 102a of the roller member 102 and the groove 109b of the lever member 109. When the overlap portion of the two discs 300 in the thickness direction is pressed between the roller members 101 and 102, the roller member 102 and the lever member 109 displace until a state in which the switch contact part 109c of the lever member 109 and the push switch 110 come in contact with each other, and output of the push switch 110 makes a High to Low transition (see FIG. 15). As the output of the push switch 110 makes the transition, insertion of a plurality of discs 300 into the device is identified and the auto loading of the disc 300 is stopped and the operation direction of the drive source not shown is reversed for reversing the rotation direction of the roller member 101 and transporting the plurality of discs 300 (for example, two discs 300) to the ejection completion position.

Figure 16:
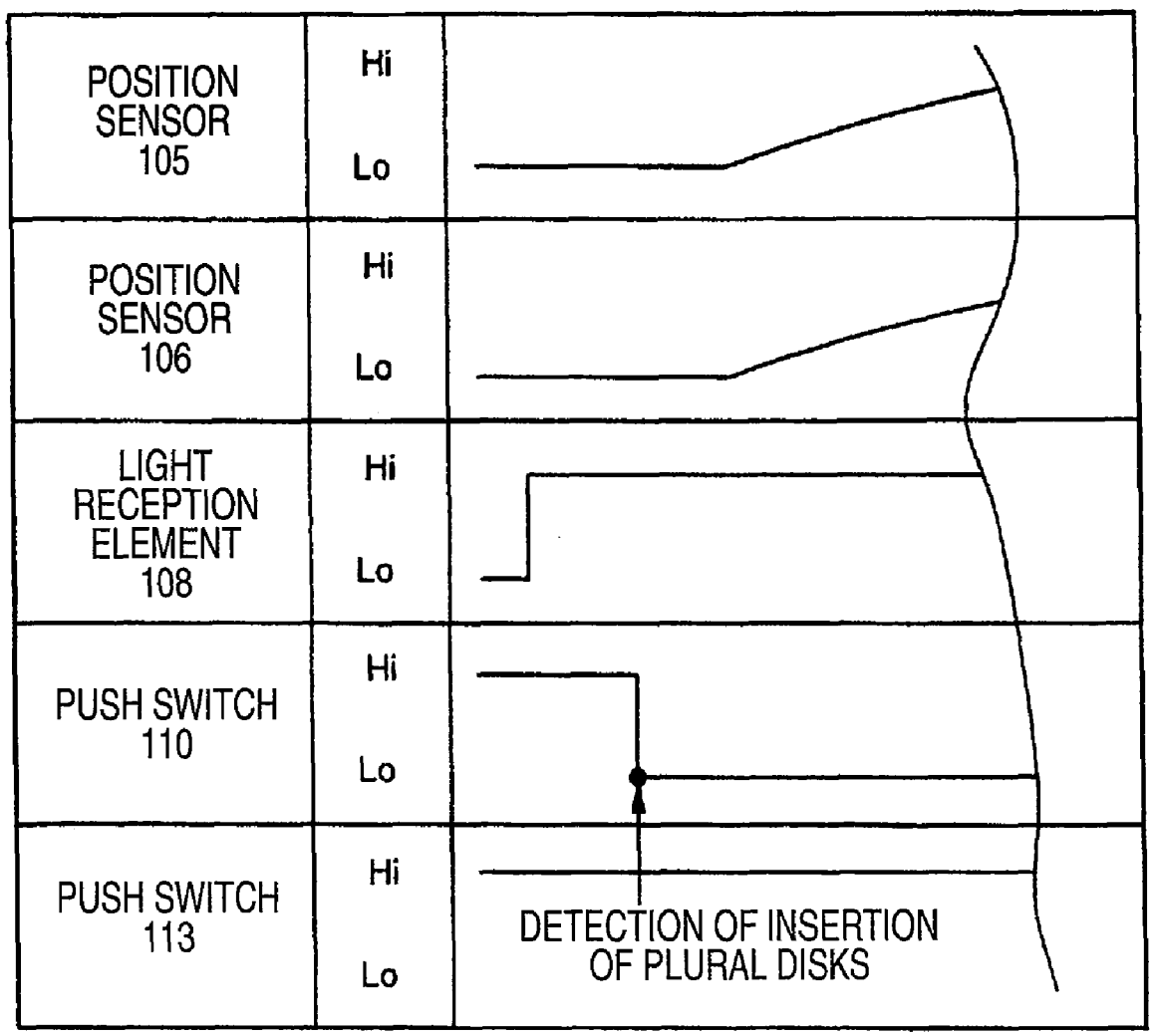
FIG. 16 is a timing chart of outputs of sensors of the disc device when two discs pass through the disc insertion-ejection section in the disc device of the first embodiment of the invention.
Figure 17:
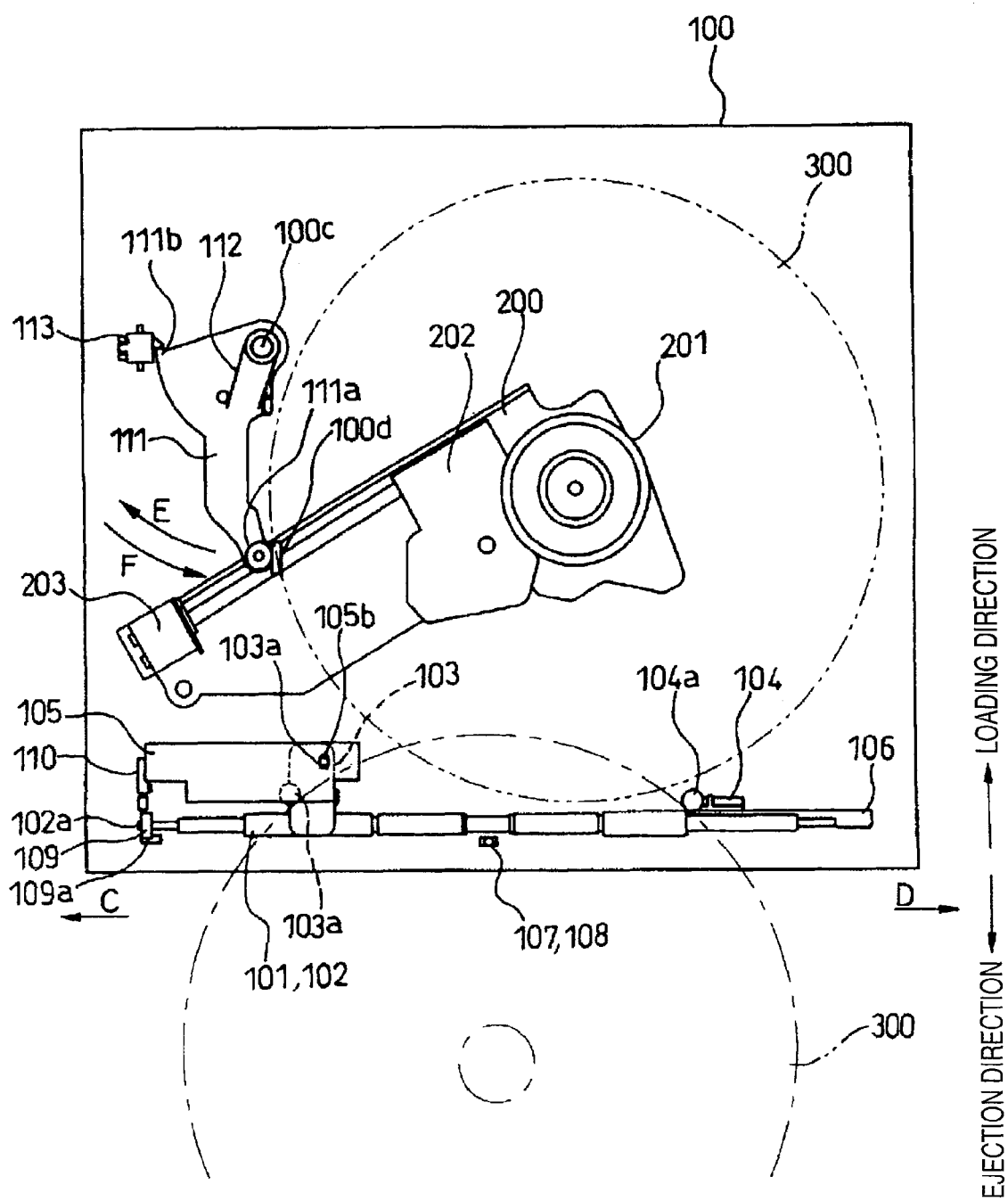
FIG. 17 is a top view of the disc device main part when two discs pass through the disc insertion-ejection section in the disc device of the first embodiment of the invention.
Figure 18:
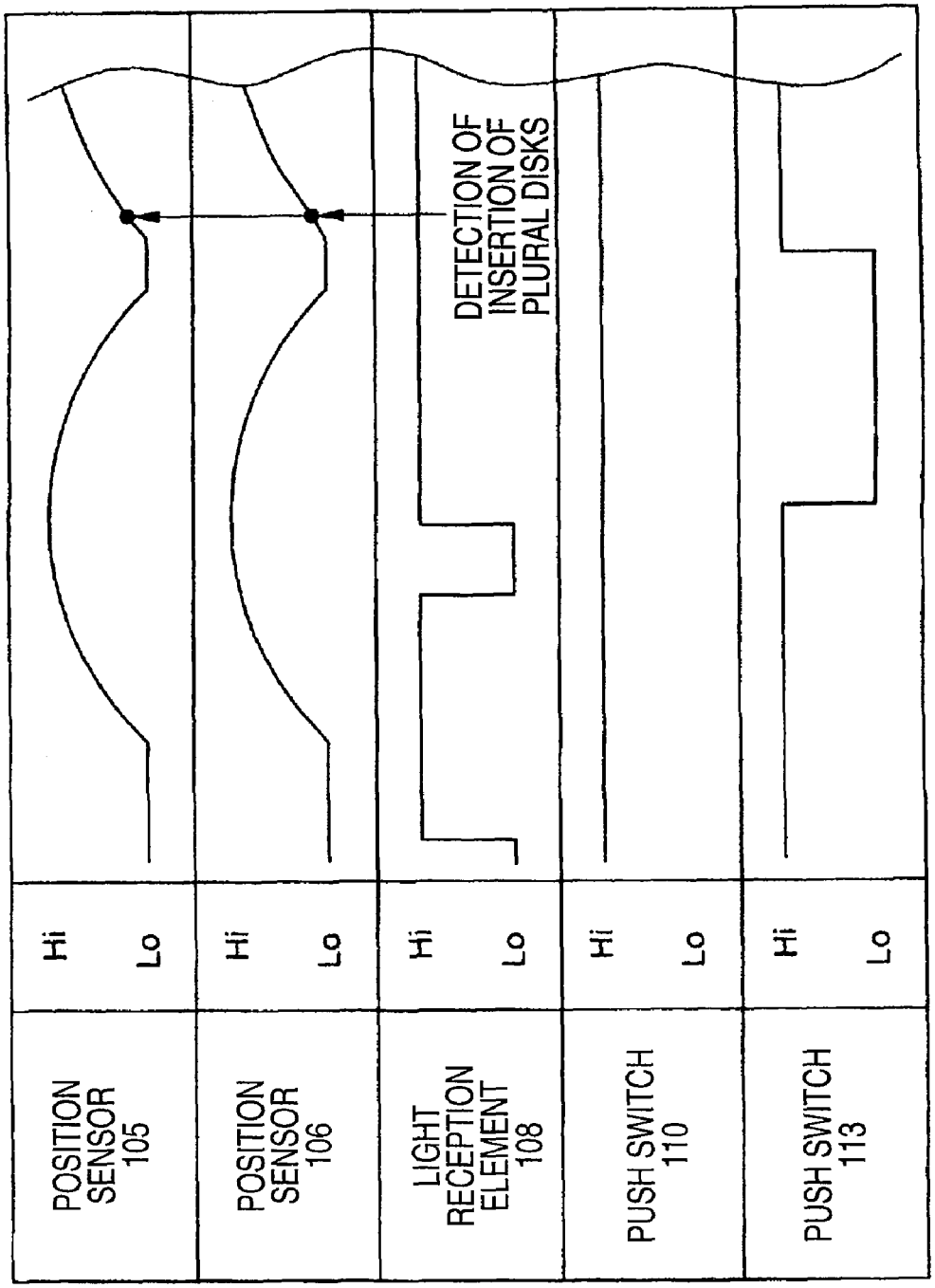
FIG. 18 is a timing chart of outputs of sensors of the disc device when two discs pass through the disc insertion-ejection section in the disc device of the first embodiment of the invention.

FIG. 16 shows the states of the position sensors 105 and 106, the light reception element 108, and the push switches 110 and 113 during the operation described above. A control section not shown detects the output transition of the push switch 110, determines insertion of a plurality of discs, and gives a command of reversing the rotation of the roller member 101.

Next, the operation when a plurality of discs 300 (for example, two discs 300) are inserted into the device in a state in which the shift amount of the discs 300 is large and no overlap in the thickness direction exists will be discussed. In this case, no change occurs in the output level of the push switch 110 in a state in which the first disc 300 is loaded. Engagement of the disc 300 going ahead and the stem member 103a of the lever member 103 and the stem member 104a of the lever member 104 is released and the output levels of the position sensors 105 and 106 are restored to the initial position.

In this state, if the second disc 300 is advanced, the disc 300 going behind engages the stem member 103a of the lever member 103 and the stem member 104a of the lever member 104 and the lever member 103 starts to slide in the C direction in the figure and the lever member 104 starts to slide in the D direction in the figure. Accordingly, the output levels of the position sensors 105 and 106 increase. At this timing, insertion of a plurality of discs 300 into the device is detected and the auto loading of the disc 300 is stopped and the operation direction of the drive source not shown is reversed for reversing the rotation direction of the roller member 101 and transporting the second disc 300 to the ejection completion position.

In the embodiment, the roller member 101 is rotated by the drive source not shown, thereby loading and ejecting the disc 300. However, according to the invention, the roller member 102 may be rotated by the drive source not shown, thereby loading and ejecting the disc 300.

In the embodiment, the position of the lower face of the disc 300 is restricted by the roller member 101 and the roller member 102 is made movable in response to the upper face position of the disc 300 and displacement of the roller member 102 is detected using the lever member 109 and the push switch 110. However, the position of the upper face of the disc 300 may be restricted by the roller member 102 and the roller member 101 may be made movable in response to the lower face position of the disc 300 and displacement of the roller member 101 may be detected using the lever member 109 and the push switch 110.

In the embodiment, displacements of the lever member 109 and the lever member 111 are detected using the push switches 110 and 113 respectively, but may be detected using a light emission element and a light reception element in combination or with a position sensor.

In the embodiment, displacement of the roller member 102 is detected using the lever member 109 and the push switch 110, but may be detected directly by a push switch, using a light emission element and a light reception element in combination, or with a position sensor. Likewise, displacement of the roller member 102 may be restricted and the roller member 101 may be made displaceable and displacement of the roller member 101 may be detected directly by a push switch, using a light emission element and a light reception element in combination, or with a position sensor.

In the embodiment, displacements of the lever members 103 and 104 in the side-to-side direction of the device (C direction, D direction in the figure) are detected by the position sensors 105 and 106, but may be detected using a light emission element and a light reception element in combination or with a push switch for detecting the start position of the lever member 103, 104 and the maximum displacement position of the lever member 103, 104 in the side-to-side direction of the device.

Second Embodiment

Figure 19:
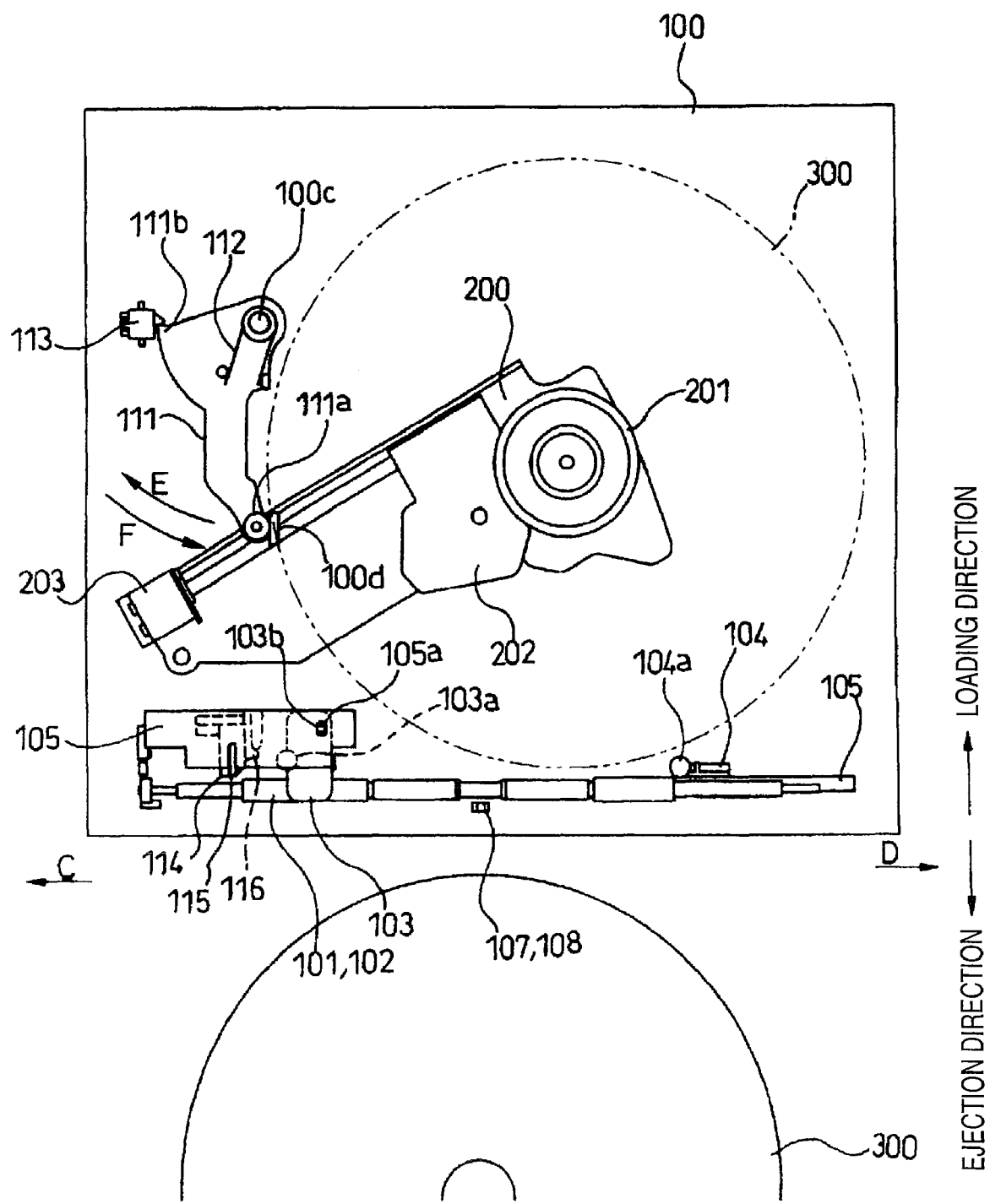
FIG. 19 is a top view of the disc device main part of a second embodiment of the invention.
Figure 20:
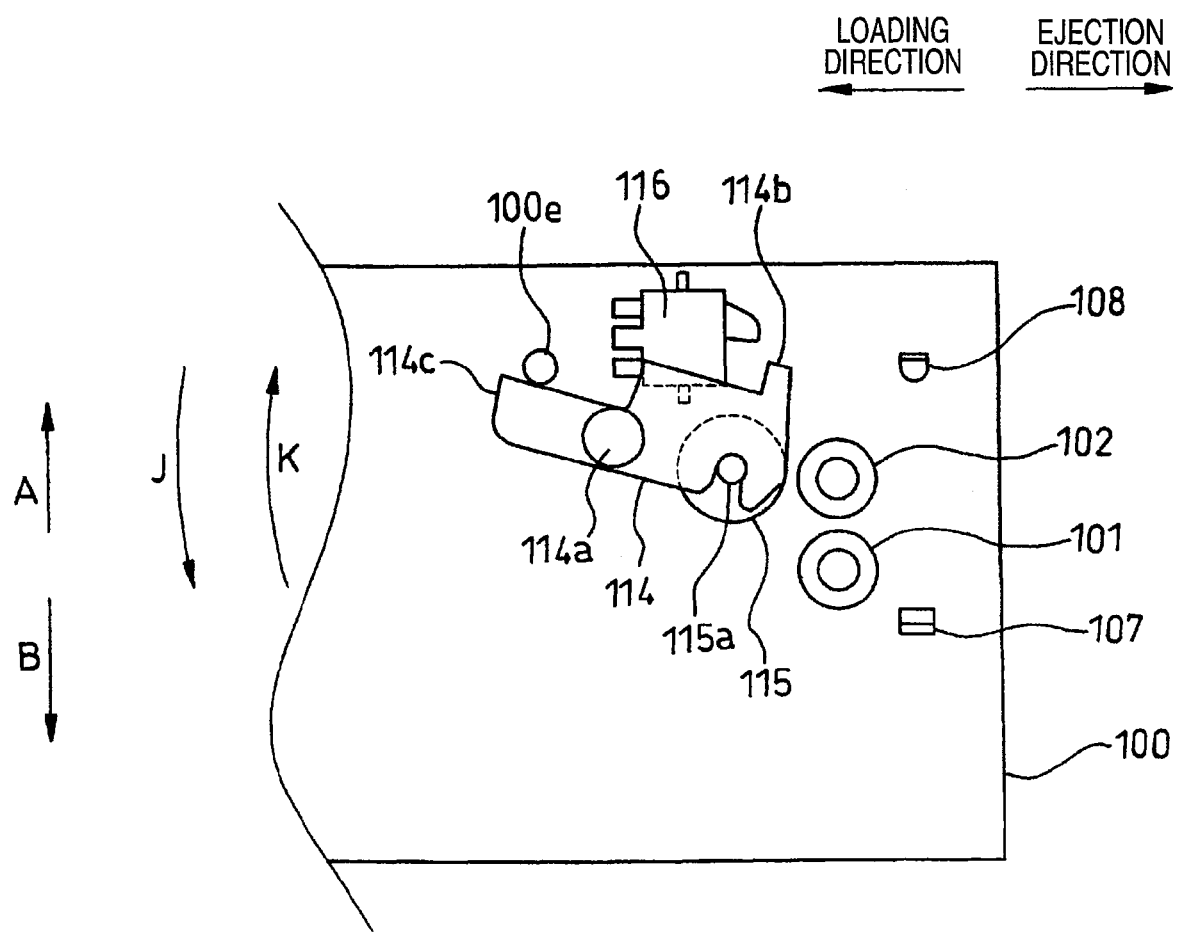
FIG. 20 is a side view of the disc device main part of the second embodiment of the invention.

FIGS. 19 and 20 show a disc device of a second embodiment of the invention. FIG. 19 is a top view of the disc device main part of the second embodiment of the invention and FIG. 20 is a side view of the disc device main part of the second embodiment of the invention.

In the embodiment, a lever member 114 and a roller member 115 for coming in contact with a disc 300 inserted into the device are provided and function as thickness detection members. A push switch 116 whose state changes in response to the position of the lever member 114 is also provided. The lever member 114 is provided with a stem member 114a, a switch contact part 114b, and a stopper contact part 114c. The lever member 114 is also provided with a roller member 115 that can rotate with a stem member 115a as a supporting point. The lever member 114 is placed rotatably on the stem member 114a with respect to a cabinet 100. The cabinet 100 is provided with an elastic member (not shown) for urging the lever member 114 in a K direction in the figure and the stopper contact part 114c provided on the lever member 114 comes in contact with a stopper part 100e provided in the cabinet 100 and the lever member 114 is held at the initial position in a state in which no disc is inserted into the device. At this position, the roller member 115 provided on the lever member for rotation is projected to a disc transport passage formed by roller members 101 and 102. The lever member 114 is provided with the roller member 115 and the roller member 115 is brought into contact with the disc inserted into the device, so that a contact flaw with the disc inserted into the device is decreased.

The roller member 115 for coming in contact with the disc 300 inserted into the device is placed to the depth in the disc insertion direction from the roller members 101 and 102 for disc transportation and at a position adjacent to the roller members 101 and 102. Accordingly, the possibility of erroneous detection as to whether one disc is inserted or a plurality of discs are inserted depending on the disc inclination when a disc is inserted into the device can be decreased.

Figure 21:
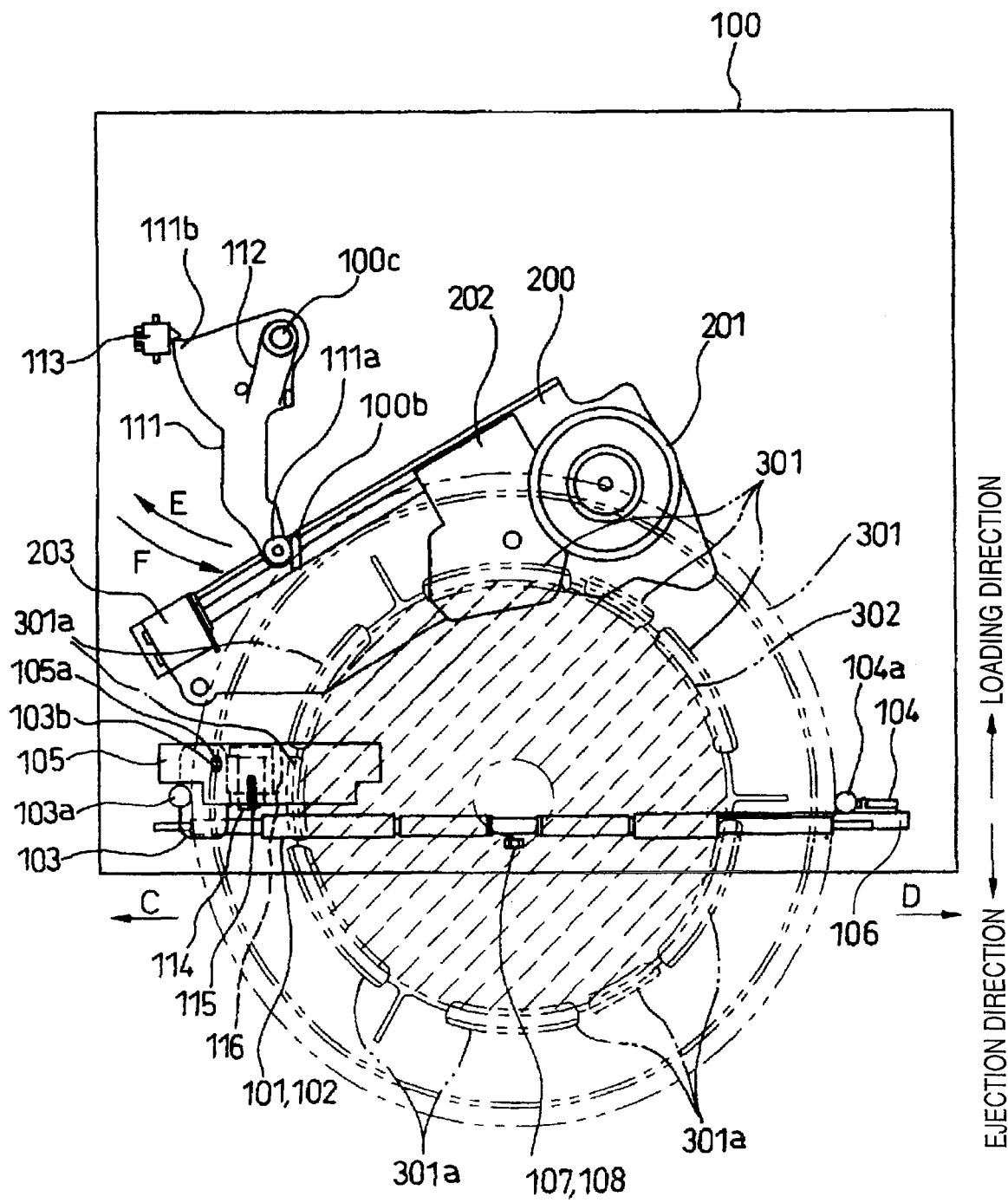
FIG. 21 is a top view of the disc device main part into which an 8-cm disc attached to an 8-cm adapter is inserted in the disc device of the second embodiment of the invention.
Figure 22:
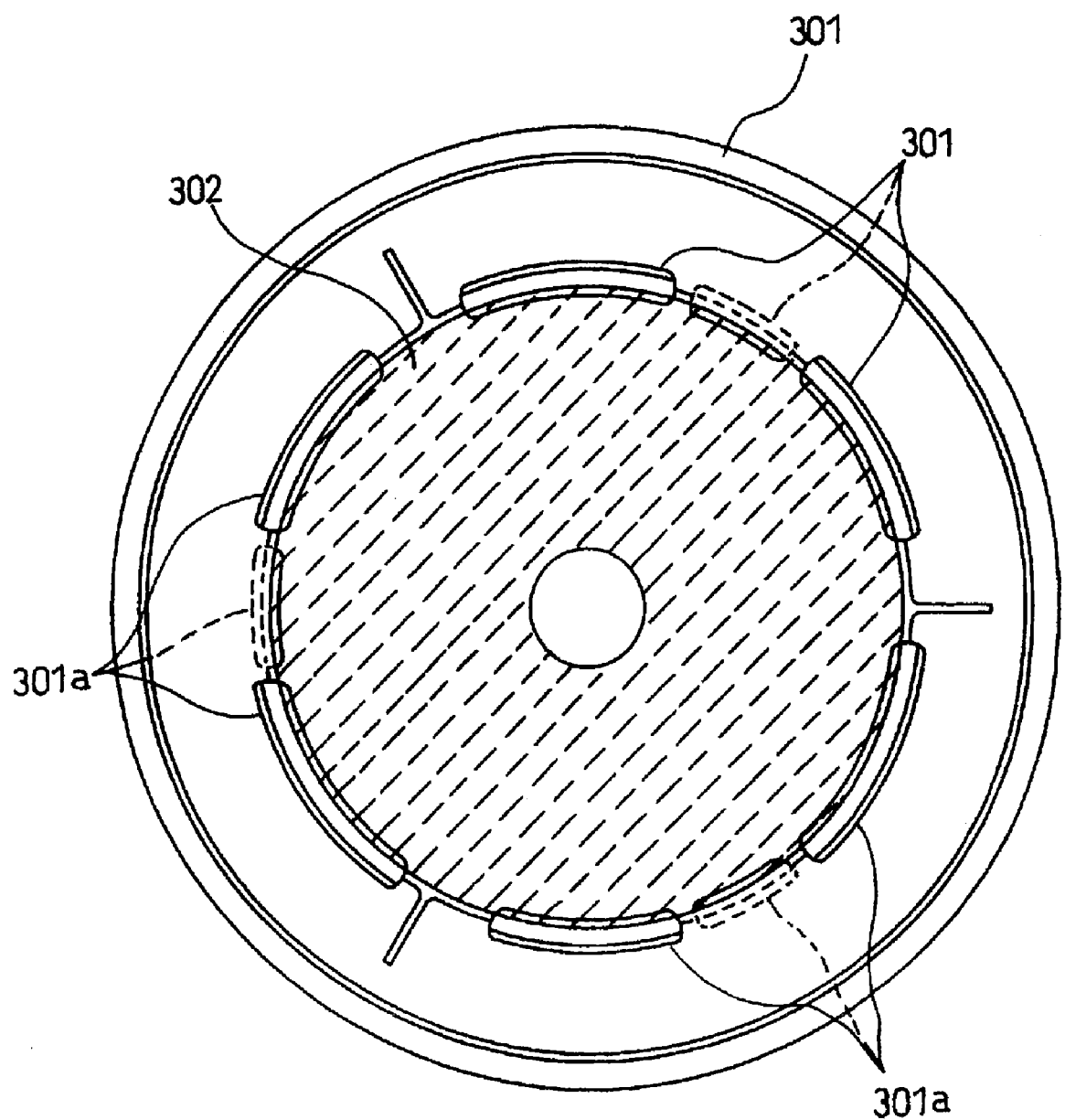
FIG. 22 is a top view of the 8-cm adapter holding an 8-cm disc used with the disc device of the embodiment of the invention.
Figure 23:
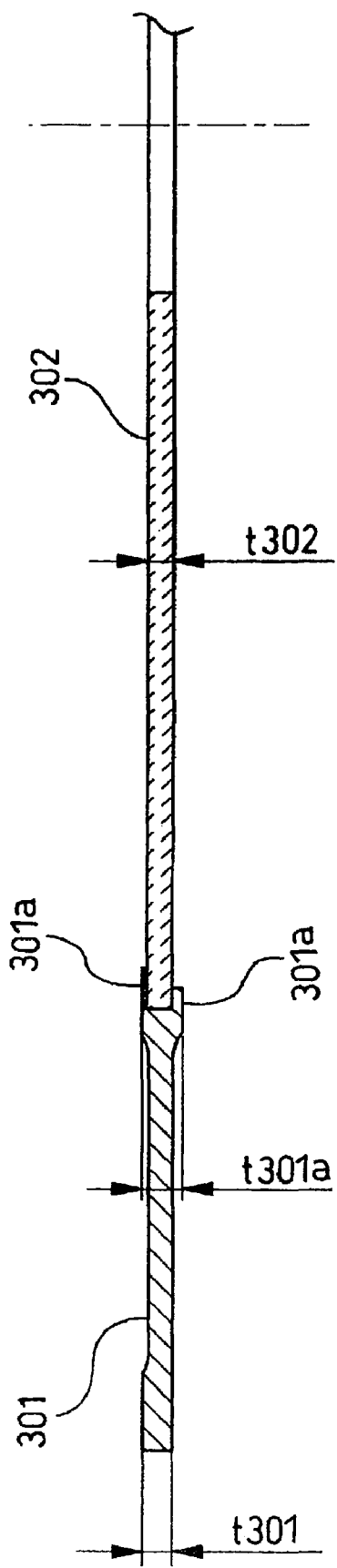
FIG. 23 is a sectional view of the 8-cm adapter holding an 8-cm disc used with the disc device of the embodiment of the invention.

An adapter for holding an 8-cm disc in the center can also be inserted into the disc device of the embodiment like the disc device of the first embodiment. FIG. 22 is a top view of an 8-cm adapter holding an 8-cm disc and FIG. 23 is a sectional view of the 8-cm adapter holding an 8-cm disc. FIG. 21 is a top view of the disc device main part into which an 8-cm disc attached to the 8-cm adapter is inserted.

As shown in FIG. 21, the roller member 115 for coming in contact with the disc 300 inserted into the device is placed outside in the width direction relative to the disc insertion direction from the range in which a plurality of 8-cm disc holding claws 301a provided on an 8-cm disc adapter 301 can pass through when the 8-cm disc adapter 301 is inserted into the device. Accordingly, thickness (t301a in the figure) portion of the plurality of 8-cm disc holding claws 301a projecting from disc thickness (t302 in the figure) and adapter thickness (t301 in the figure) and the roller member 115 are prevented from coming in contact with each other and when the 8-cm disc adapter 301 holding an 8-cm disc 302 in the center is inserted into the device, the possibility of erroneous detection as to whether one disc is inserted or a plurality of discs are inserted is decreased.

If no disc 300 is inserted into the device or if one disc 300 is inserted, the switch contact part 114b provided on the lever member 114 does not come in contact with the push switch 116 and thus output of the push switch 116 remains High and if a plurality of discs (for example, two discs) are pressed between the roller member 101 and the roller member 102, the switch contact part 114b provided on the lever member 114 comes in contact with the push switch 116 and thus output of the push switch 116 goes Low. Thus, the thickness of the disc inserted into the device can be detected according to the output of the push switch 116

The configuration of the device other than described above is similar to that of the first embodiment of the invention and therefore will not be discussed again.

Next, the loading operation, the ejection operation, and the operation for a plurality of discs, of the disc device of the embodiment will be discussed.

(1) Loading Operation of Disc 300

When the user inserts the disc 300 into the disc insertion slot 100a of the cabinet 100 of the disc device, light emitted from a light emission element 107 is shielded by the disc 300 and output of a light reception element 108 changes to a High state, thereby detecting insertion of the disc 300 into the disc device, and the disc device starts the operation of a power source to start rotation of the roller member 101.

If the user further inserts the disc 300, the disc 300 is pressed between the roller members 101 and 102 and auto loading of the disc 300 is started.

If the auto loading of the disc 300 is continued, the disc 300 comes in contact with the roller member 115 provided on the lever member 114 and the lever member 114 rotates in a J direction in the figure with the stem member 114a as a supporting point. However, if one disc is inserted into the device, the switch contact part 114b of the lever member 114 and the push switch 116 do not come in contact with each other and output of the push switch 116 remains High.

When the disc 300 further proceeds, the disc 300 comes in contact with stem members 103a and 104a of the lever members 103 and 104 and the lever member 103 starts to slide in a C direction in the figure and the lever member 104 starts to slide in a D direction in the figure. Accordingly, the output levels of position sensors 105 and 106 increase and reach the maximum in a state in which the portion of the largest diameter of the disc 300 comes in contact with the stem members 103a and 104a.

When the disc 300 further proceeds, the disc 300 comes in contact with a roller member 111a of the lever member 111 and the lever member 111 starts to rotate in an E direction in the figure against the urging force of an elastic member 112. The lever member 111 rotates and a switch contact part 111b of the lever member 111 comes in contact with a push switch 113, whereby the output of the push switch 113 makes a High to Low transition.

When the disc 300 further proceeds, the disc 300 is brought out of contact with the stem member 103a of the lever member 103 and the stem member 104a of the lever member 104 and the lever members 103 and 104 are held at the initial position. The output levels of the position sensors 105 and 106 are also restored to the initial position.

When the disc 300 further proceeds, pressing the disc 300 between the roller members 101 and 102 is released and the disc 300 is moved in the record and playback position direction by the action of the lever member 111 and the elastic member 112. The engagement of the lever member 111 and the push switch 113 is released and the output of the push switch 113 makes a Low to High transition. The operation of the drive source not shown is stopped at the timing at which the output of the push switch 113 makes the Low to High transition, whereby rotation of the roller member 101 stops.

Next, the disc 300 is transported to the record and playback position of a disc record and playback section 200 by a mechanism not shown, and is held on a spindle motor 201. As the operation is performed, the loading operation of the disc 300 is completed and the disc device enters a state in which it can record and play back the disc 300.

(2) Ejection Operation of Disc 300

First, holding the disc 300 on the spindle motor 201 is released by a mechanism not shown and the ejection operation of the disc 300 is started. Next, the disc 300 is transported in the ejection direction by the mechanism not shown and comes in contact with the roller member 111a of the lever member 111 and the lever member 111 starts to rotate in the E direction in the figure against the urging force of the elastic member 112. The lever member 111 rotates and the switch contact part 111b of the lever member 111 comes in contact with the push switch 113, whereby the output of the push switch 113 makes a High to Low transition. The operation of the drive source not shown is started at the timing at which the output of the push switch 113 makes the Low to High transition, whereby rotation of the roller member 101 is started.

When the disc 300 is further transported by the mechanism not shown, the disc 300 and the roller member 101 come in contact with each other and the disc 300 is pressed between the roller members 101 and 102, whereby transporting of the disc 300 by the roller member 101 is started. The disc 300 proceeds in the ejection direction at the opposite timing to the loading time and is transported to an ejection completion position.

The ejection completion of the disc 300 is detected by the light reception element 108, the position sensors 105 and 106, or detection means not shown. As the operation is performed, the ejection operation of the disc 300 is completed.

(3) Operation for a Plurality of Discs 300

Figure 24:
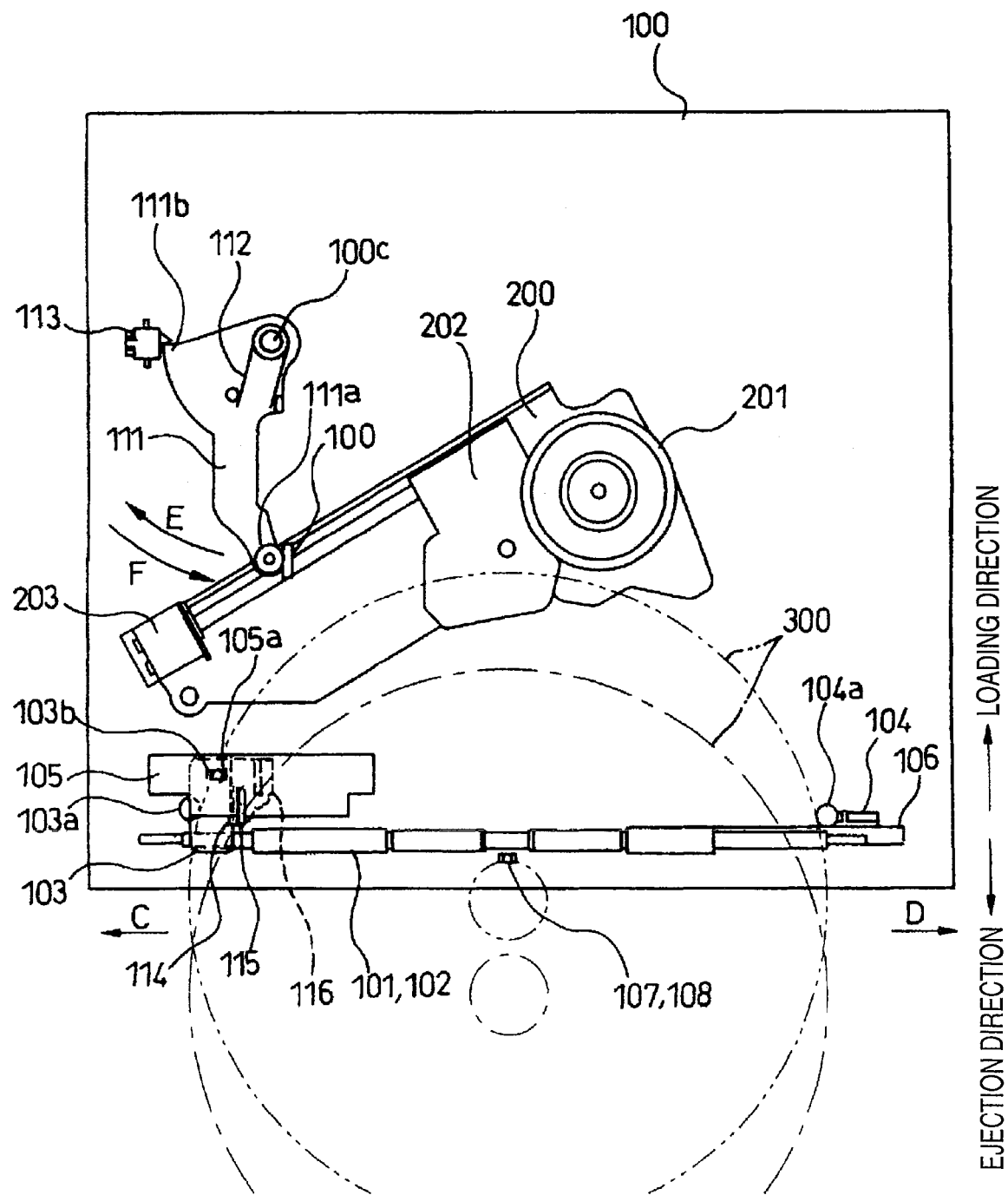
FIG. 24 is a top view of the disc device main part when two discs pass through a disc insertion-ejection section in the disc device of the second embodiment of the invention.
Figure 25:
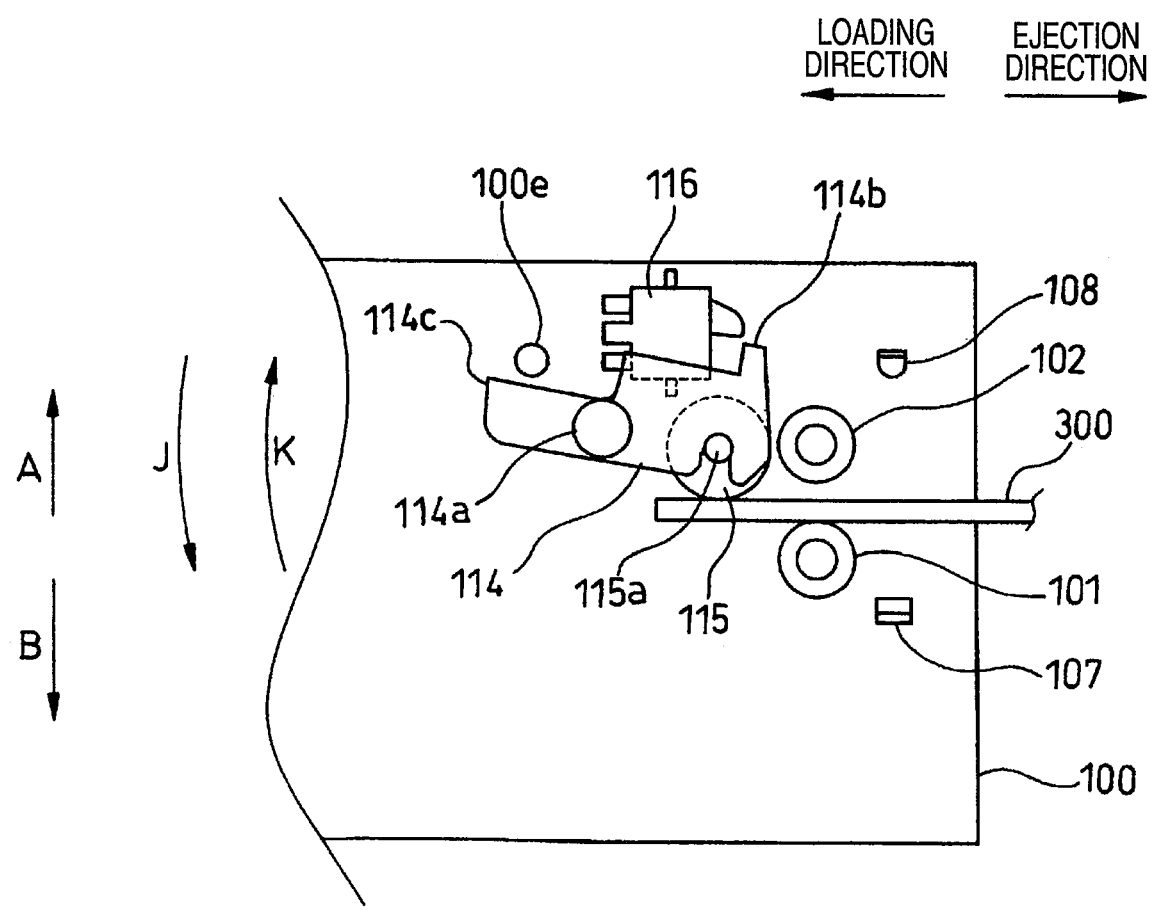
FIG. 25 is a side view of the disc device main part when a disc passes through the disc insertion-ejection section in the disc device of the second embodiment of the invention.
Figure 26:
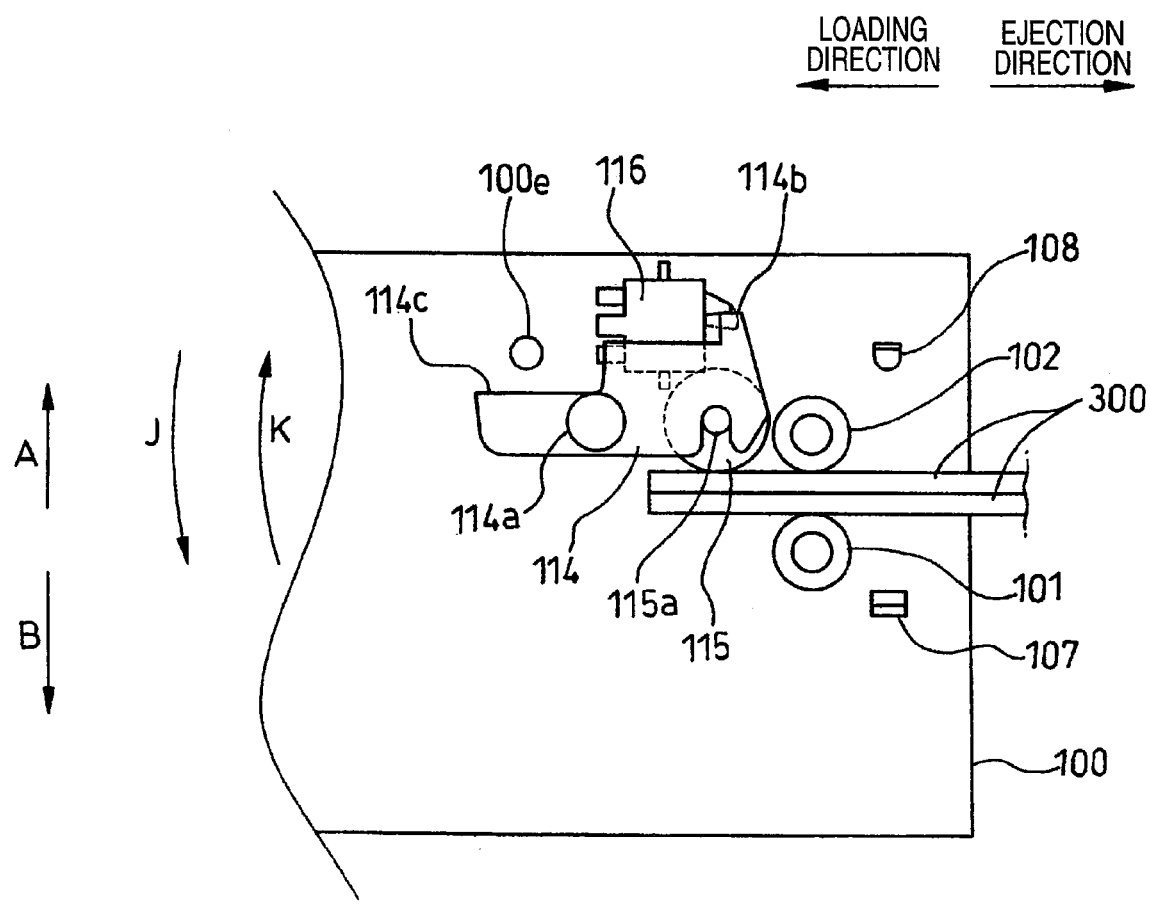
FIG. 26 is a side view of the disc device main part when two discs pass through the disc insertion-ejection section in the disc device of the second embodiment of the invention.
Figure 27:
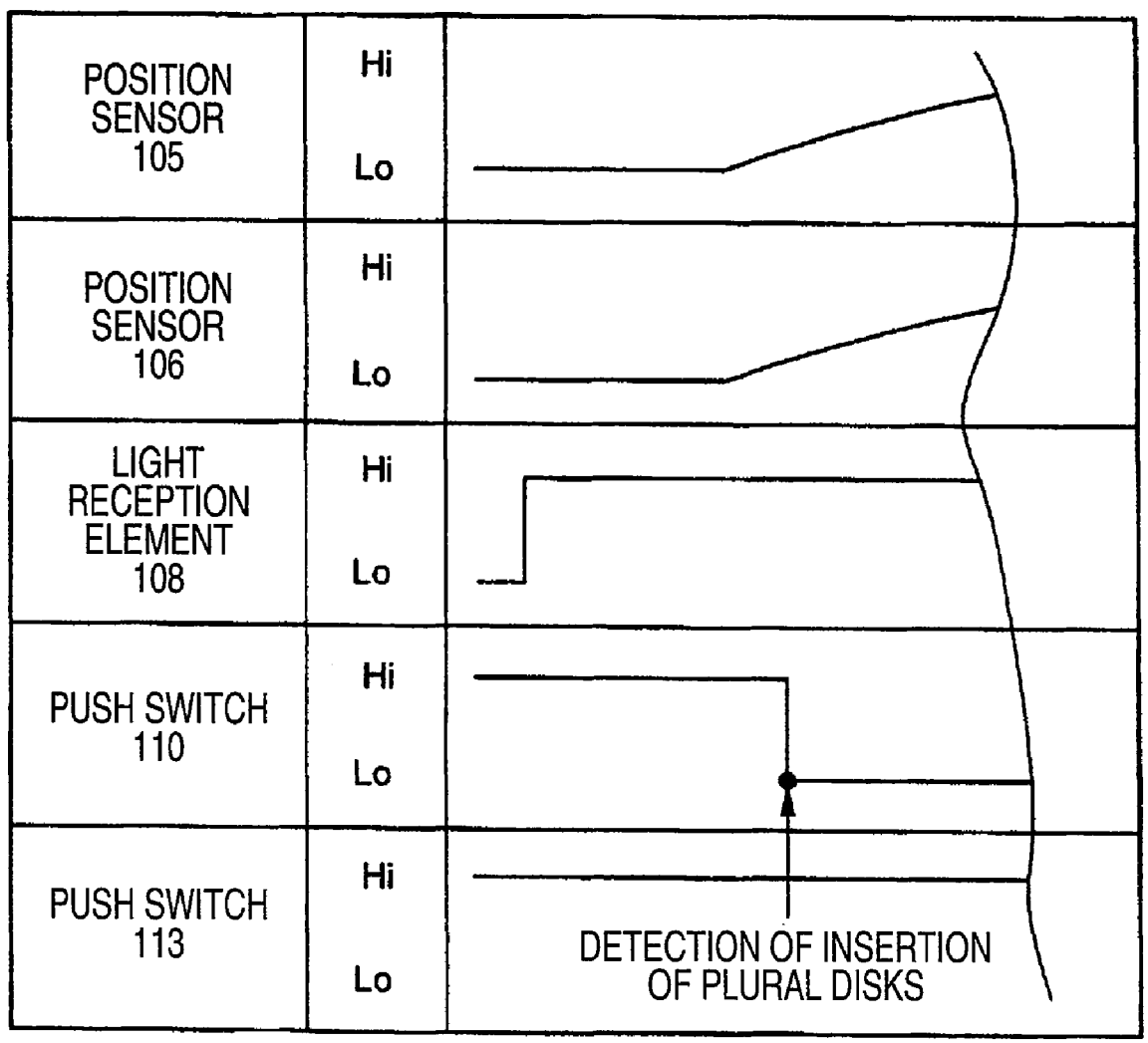
FIG. 27 is a timing chart of outputs of sensors of the disc device when two discs pass through the disc insertion-ejection section in the disc device of the second embodiment of the invention.
Figure 28:
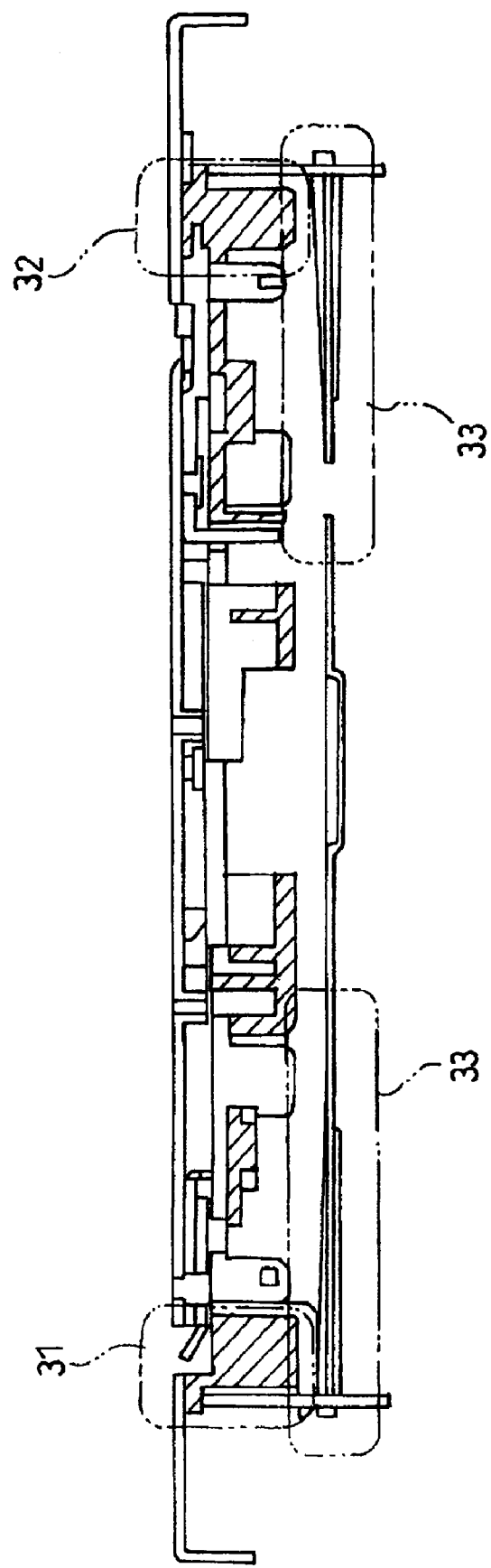
FIG. 28 is a front view to show a disc insertion-ejection device in a related art.
Figure 29:
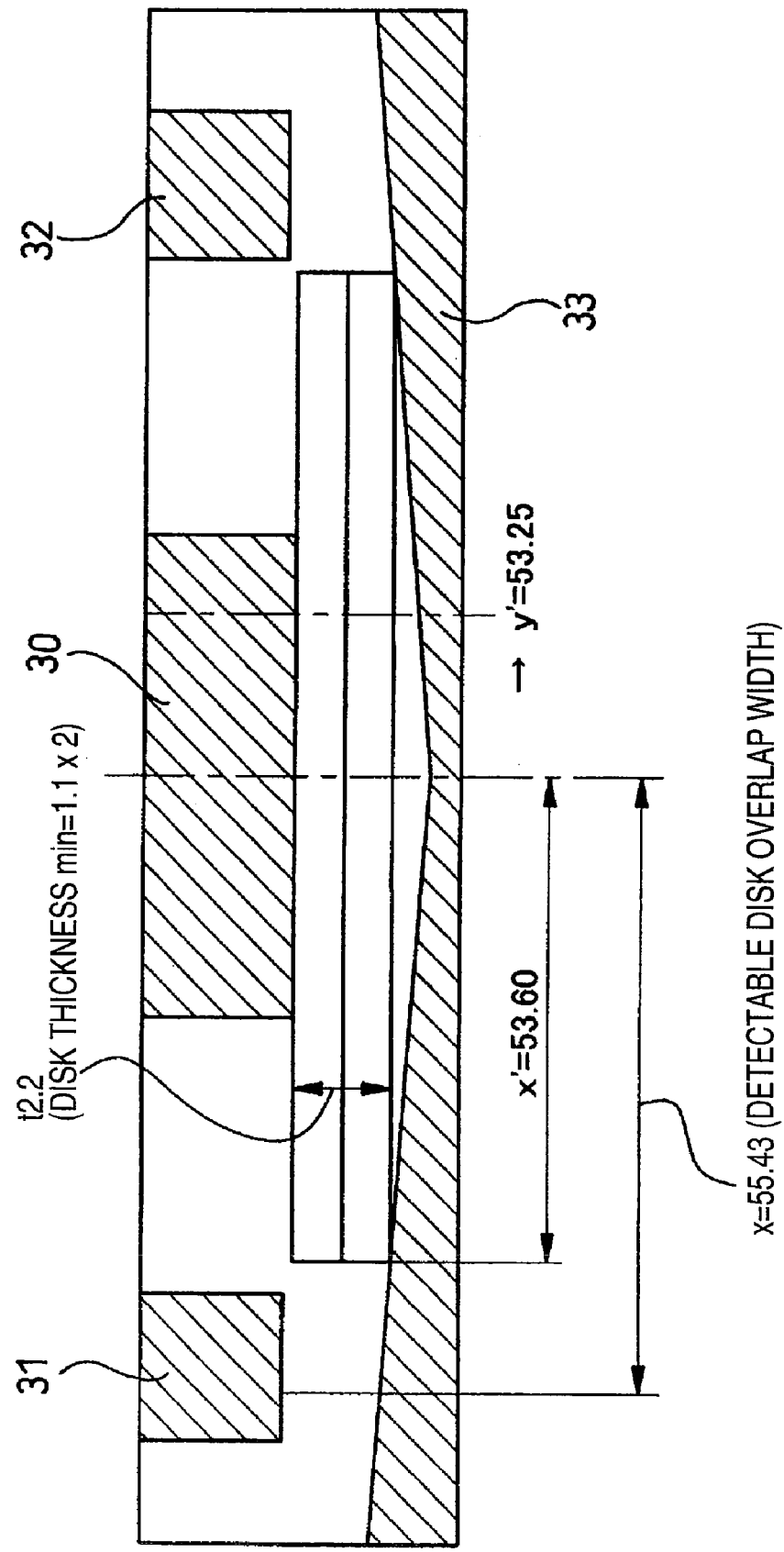
FIG. 29 is a front view to show the disc insertion-ejection device main part if two discs are inserted into the disc insertion-ejection device in the related art in an overlap manner.

Next, the operation of the disc device for a plurality of discs 300 (in the example, two discs) will be discussed with FIGS. 24, 25, 26, and 27. FIG. 24 is a top view of the disc device main part when two discs pass through a disc insertion-ejection section in the second embodiment of the invention, FIG. 25 is a side view of the disc device main part when a disc passes through the disc insertion-ejection section in the second embodiment of the invention, FIG. 26 is a side view of the disc device main part when two discs pass through the disc insertion-ejection section in the second embodiment of the invention, and FIG. 27 is a timing chart of outputs of the sensors of the disc device when two discs pass through the disc insertion-ejection section in the second embodiment of the invention.

If the user inserts two discs 300 into the disc insertion slot 100a of the cabinet 100 of the disc device, light emitted from the light emission element 107 is shielded by the disc 300 going ahead and output of the light reception element 108 changes to a High state, thereby detecting insertion of the disc 300 into the disc device, and the disc device starts the operation of the power source to start rotation of the roller member 101.

If the user further inserts the two discs 300, the disc 300 going ahead is pressed between the roller members 101 and 102, whereby auto loading of the disc 300 is started.

If the auto loading of the disc 300 is continued, the disc 300 comes in contact with the roller member 115 provided on the lever member 114 and the lever member 114 rotates in the J direction in the figure with the stem member 114a as the supporting point. When the overlap portion of the plurality of discs 300 (for example, two discs) in the thickness direction comes in contact with the roller member 115, the lever member 114 rotates until a state in which the switch contact part 114b of the lever member 114 and the push switch 116 come in contact with each other, and output of the push switch 116 makes a High to Low transition. As the output of the push switch 116 makes the transition, insertion of a plurality of discs 300 (for example, two discs) into the device is identified and the auto loading of the disc 300 is stopped and the operation direction of the drive source not shown is reversed for reversing the rotation direction of the roller member 101 and transporting the two discs 300 to the ejection completion position.

The operation when a plurality of discs 300 (for example, two discs) are inserted into the device in a state in which the shift amount of the discs 300 is large and no overlap in the thickness direction exists is similar to that of the disc device of the first embodiment except that the disc position is detected using the lever member 114 and the push switch 116, and therefore will not be discussed again.

In the embodiment, the roller member 101 is rotated by the drive source not shown, thereby loading and ejecting the disc 300. However, according to the invention, the roller member 102 may be rotated by the drive source not shown, thereby loading and ejecting the disc 300.

In the embodiment, the position of the lower face of the disc 300 is restricted by the roller member 101 and the roller member 102 is made movable in response to the upper face position of the disc 300 and the lever member 114 and the roller member 115 are placed on the upper face side of the disc 300. However, the position of the upper face of the disc 300 may be restricted by the roller member 102 and the roller member 101 may be made movable in response to the lower face position of the disc 300 and the lever member 114 and the roller member 115 may be placed on the lower face side of the disc 300.

In the embodiment, displacements of the lever member 111 and the lever member 114 are detected using the push switches 113 and 116 respectively, but may be detected using a light emission element and a light reception element in combination or with a position sensor.

In the embodiment, the lever member 114 and the roller member 115 and the push switch 116 for detecting displacement of the lever member 114 detect the thickness of the disc inserted into the device, but a push switch provided with the roller member 115 may directly detect the thickness of the disc inserted into the device.

In the embodiment, displacements of the lever members 103 and 104 in the side-to-side direction of the device (C direction, D direction in the figure) are detected by the position sensors 105 and 106, but may be detected using a light emission element and a light reception element in combination or with a push switch for detecting the start position of the lever member 103, 104 and the maximum displacement position of the lever member 103, 104 in the side-to-side direction of the device.

While the invention has been described in detail with reference to the specific embodiments, it will be obvious to those skilled in the art that various changes and modifications can be made without departing from the spirit and the scope of the invention.

This application is based on Japanese Patent Application No. 2005-008971 filed on Jan. 17, 2005, which is incorporated herein by reference.

INDUSTRIAL APPLICABILITY

As described above, the disc device of the invention includes the thickness detection member being movable in the thickness direction of the disc inserted into the disc device for coming in contact with the upper face or the lower face of the disc, the disc position detection unit for electrically detecting the thickness direction position of the thickness detection member, and the number-of-discs identification means for determining the number of inserted discs based on output of the disc position detection unit, whereby the number of discs inserted into the disc device is electrically determined and the mechanism of the disc device is controlled based on the determination result, so that stable disc insertion and ejection can be realized and damage to the mechanism of the disc device and the disc can be decreased; it is useful as a disc device, etc.

The invention claimed is:

1. A disc identification device for identifying a disc inserted into a disc device, comprising:
   a thickness detection member that is movable in a thickness direction of the disc and comes in contact with an upper face or a lower face of the disc;
   a disc position detection unit that detects a position of the thickness detection member in the thickness direction;
   a first lever member that transmits the position of the thickness detection member to the disc position detection unit, the first lever member including a detection part that is detected by the disc position detection unit; and
   a number-of-discs identification unit that determines whether the number of discs inserted into the disc device is one or plural based on an output of the disc position detection unit,
   wherein a displacement of the detection part of the first lever member is greater than a displacement of the thickness detection member in the thickness direction when the thickness detection member comes in contact with the upper face or the lower face of the disc.

2. The disc identification device according to claim 1 wherein the thickness detection member includes a disc transport roller for pressing and transporting the disc.

3. The disc identification device according to claim 1 wherein the thickness detection member comes in contact with the disc outside in a width direction relative to a disc insertion direction from a disc holding claw of an inserted adapter in which a small-diameter disc is held.

4. The disc identification device according to claim 1 wherein the thickness detection member comes in contact with the disc to the depth in the disc insertion direction from a disc transport roller for pressing and transporting the disc.

5. The disc identification device according to claim 4, wherein the thickness detection member comes in contact with a surface of a side of the disc pressed by the disc transport roller.

6. The disc identification device according to claim 1, wherein the thickness detection member includes a rotatable roller member in a contact part with the disc.

7. The disc identification device according to claim 1, comprising:
   a second lever member that is provided on the front side in the disc insertion direction and moves at a time of coming in contact with the disc,
   wherein the number-of-discs identification unit determines the number of the inserted discs based on a move timing of the second lever member.

8. The disc identification device according to claim 1 wherein the disc position detection unit includes a switch unit whose state changes in response to the position of the thickness detection member.

9. A disc insertion-ejection device for inserting and ejecting the disc based on an identification result of the disc identification device according to claim 1.

10. The disc insertion-ejection device according to claim 9, comprising:
    a disc transport passage that is capable of inserting and ejecting a plurality of discs.

11. A disc device, comprising:
    a disc identification device for identifying a disc inserted into said disc device, including:
       a thickness detection member that is movable in a thickness direction of the disc and comes in contact with an upper face or a lower face of the disc;
       a disc position detection unit that detects a position of the thickness detection member in the thickness direction;
       a first lever member that transmits the position of the thickness detection member to the disc position detection unit, the first lever member including a detection part that is detected by the disc position detection unit; and
       a number-of-discs identification unit that determines whether the number of discs inserted into the disc device is one or plural based on an output of the disc position detection unit; and
    a disc insertion-ejection device for inserting and ejecting the disc based on an identification result of the disc identification device,
    wherein a displacement of the detection part of the first lever member is greater than a displacement of the thickness detection member in the thickness direction when the thickness detection member comes in contact with the upper face or the lower face of the disc.

12. An electronic apparatus comprising the disc device according to claim 11.

* * * * *